United States Patent
Mayoshi et al.

(10) Patent No.: US 11,407,425 B2
(45) Date of Patent: Aug. 9, 2022

(54) VEHICLE CONTROL DEVICE FOR EXECUTING A LIMIT CONTROL FOR LIMITING A DRIVING FORCE OF A VEHICLE

(71) Applicant: TOYOTA JIDOSHA KABUSHIKI KAISHA, Toyota (JP)

(72) Inventors: Kan Mayoshi, Toyota (JP); Yoshikatsu Oda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 16/791,786

(22) Filed: Feb. 14, 2020

(65) Prior Publication Data
US 2020/0262446 A1 Aug. 20, 2020

(30) Foreign Application Priority Data
Feb. 18, 2019 (JP) .............................. JP2019-026483

(51) Int. Cl.
*B60W 50/08* (2020.01)
*B60W 50/12* (2012.01)
(Continued)

(52) U.S. Cl.
CPC ........... *B60W 50/12* (2013.01); *B60K 26/021* (2013.01); *B60W 50/087* (2013.01); *B60W 50/10* (2013.01); *B60W 50/16* (2013.01)

(58) Field of Classification Search
CPC ...... B60W 50/12; B60W 50/16; B60W 50/10; B60W 50/087; B60W 2540/16;
(Continued)

(56) References Cited

U.S. PATENT DOCUMENTS

2010/0023234 A1* 1/2010 Kameyama ........... B60W 50/08
701/70
2017/0135277 A1* 5/2017 Hiramatsu ........... G05D 1/0255

FOREIGN PATENT DOCUMENTS

CN 102555903 A * 7/2012
JP 2010092115 A * 4/2010
(Continued)

OTHER PUBLICATIONS

U.S. Appl. No. 16/276,022.

*Primary Examiner* — Donald J Wallace
*Assistant Examiner* — Daniel M. Robert
(74) *Attorney, Agent, or Firm* — Hunton Andrews Kurth LLP

(57) ABSTRACT

A vehicle control device comprises an accelerator (22a) which a driver of a vehicle operates in order to accelerate the vehicle, and a controller configured to execute a limit control for imposing a limitation on a driving force, in such a manner that the driving force is prevented from becoming excessively large, when a predetermined limit condition is satisfied. The controller executes the limit control and a mistaken operation notification, when a mistaken operation state has been occurring. The controller executes a failure notification, when the mistaken operation state has not been occurring at a failure occurrence time point at which a control failure that the controller cannot execute the limit control has occurred. The controller continues executing the mistaken operation notification without executing the failure notification at the failure occurrence time point, if the mistaken operation state has been occurring at the failure occurrence time point.

5 Claims, 10 Drawing Sheets

(51) Int. Cl.
*B60W 50/16* (2020.01)
*B60W 50/10* (2012.01)
*B60K 26/02* (2006.01)

(58) Field of Classification Search
CPC ....... B60W 2520/10; B60W 2720/106; B60W 50/14; B60W 2050/146; B60W 2540/10; B60W 50/0205; B60W 30/02; B60W 2050/143; B60K 26/021
See application file for complete search history.

(56) References Cited

FOREIGN PATENT DOCUMENTS

| | | | |
|---|---|---|---|
| JP | 2014-088067 A | | 5/2014 |
| JP | 2014088067 A | * | 5/2014 |
| JP | 2017-114145 A | | 6/2017 |

* cited by examiner

VEHICLE CONTROL DEVICE FOR EXECUTING A LIMIT CONTROL FOR LIMITING A DRIVING FORCE OF A VEHICLE

CROSS-REFERENCE TO RELATED APPLICATION

The present application claims priority to Japanese Patent Application No. 2019-026483 filed on Feb. 18, 2019, which is incorporated herein by reference in its entirety.

TECHNICAL FIELD

The present disclosure relates to a vehicle control device configured to execute a limit control for limiting a driving force of the vehicle in order to prevent the driving force from becoming excessively large when a predetermined limit condition is satisfied.

BACKGROUND

Hitherto, there has been known a vehicle control device (hereinafter, referred to as "a conventional device") configured to start executing a limit control when a predetermined limit condition becomes satisfied (referring to Japanese Patent Application Laid-Open 2014-88067).

The limit control is a control for controlling/limiting a driving force acting on/to driving wheels of a vehicle in order to prevent the driving force from exceeding a limit driving force determined in response to a target acceleration acquired based on a vehicle speed.

SUMMARY

"A condition which is satisfied when a mistaken operation state on the accelerator occurs" is considered as one of the above limit conditions. The mistaken operation state on the accelerator occurs when a driver operates an accelerator by mistake (or mistakenly). The inventors has developed a device (hereinafter, referred to as "a developing device") configured to execute the limit control and a mistaken operation notification for urging the driver to end/stop/terminate the mistaken operation state on the accelerator.

Meanwhile, a failure (or a control failure) that the limit control cannot be executed may occur. The above Japanese Patent Application Laid-Open 2014-88067 does not disclose what kind of notification the conventional device executes when the failure occurs. Typically, it may be assumed that such a device executes a failure notification to notify the driver of an occurrence of the failure immediately after the failure occurs.

There is a high possibility that the vehicle may be accelerated in a driver's unexpected/unintended manner (or in a manner that the driver does not intend) when the mistaken operation state is occurring. Such an acceleration of the vehicle is apt to make the driver feel uneasy. In view of this, when the above described failure occurs, executing a notification to urge the driver to terminate/stop the mistaken operation on the accelerator is considered to be more important than executing the notification to just notify the driver of the occurrence of the above described failure.

However, since the developing device executes the failure notification immediately after the failure occurs, the developing device cannot execute the notification to urge the driver to terminate/stop the mistaken operation on the accelerator. Accordingly, the developing device has low possibility of making the driver stop/terminate the mistaken operation on the accelerator if the mistaken operation state has been occurring since a time point before the above described failure occurs (i.e., when the above described failure occurs while the mistaken operation state is occurring).

The present disclosure has been made to solve the problem described above. The present disclosure has an object to provide a vehicle control device which does not lower the possibility of being able to make the driver stop/terminate the mistaken operation on the accelerator when the mistaken operation on the accelerator occurs while the above described failure has been occurring.

A vehicle control device (hereinafter, referred to as "the present control device") according to the present disclosure comprises:

an accelerator (22a) which a driver of a vehicle operates in order to accelerate the vehicle; and a controller (10, 20, 24, 26, 30) configured to execute a limit control for limiting a driving force of the vehicle in order to prevent the driving force from becoming excessively large, when determining that a predetermined limit condition is satisfied, the driving force being a force which is changed depending on an operation amount of the accelerator.

an accelerator (22a) which a driver of a vehicle operates in order to accelerate the vehicle; and a controller (10, 20, 24, 26, 30) configured to execute a limit control for imposing a limitation on a driving force varied depending on an operation amount of the accelerator and applied to the vehicle, in such a manner that the driving force is prevented from becoming excessively large, when the controller determines that a predetermined limit condition is satisfied.

The controller is configured to:

determine whether or not a mistaken operation state has occurred (Steps 400 through 495, Steps 500 through 595), the mistaken operation state being a state in which the driver has a high possibility of operating the accelerator while mistaking the accelerator for another driving operation element;

determine that the limit condition is satisfied to execute the limit control (Step 925, Step 930) and a mistaken operation notification for urging the driver to end operating the accelerator (Step 1130), when it is determined that the mistaken operation state has occurred ("Yes" at Step 915);

determine whether or not a control failure that the controller cannot execute the limit control has occurred (Steps 1000 through 1095);

execute a failure notification for notifying the driver that the control failure is occurring (Step 1125) at a failure occurrence time point at which it is determined that the control failure has occurred, if it is determined that the mistaken operation state has not been occurring at the failure occurrence time point ("No" at Step 1105, "No" at Step 1110); and continue executing the mistaken operation notification without executing the failure notification (Step 1130) at the failure occurrence time point, if it is determined that the mistaken operation state has been occurring at the failure occurrence time point ("Yes" at Step 1105).

The present control device continues executing the mistaken operation notification at the failure occurrence time point, if it is determined that the mistaken operation state has been occurring at the failure occurrence time point. Therefore, present control device can prevent a possibility that driver is urged to end/stop the mistaken stepping from being lowered, even after the control failure has occurred.

In one embodiment of the present disclosure, the controller is configured to:

determine whether or not an excessively large operation state which is different from the mistaken operation state has occurred (Steps 700 through 795), the excessively large operation state being a state in which the controller can regard that the operation amount of the accelerator is excessively large;

determine that the limit condition is satisfied to execute the limit control (Step 945), when it is determined that the excessively large operation state has occurred ("Yes" at Step 935);

execute an excessively large operation notification for notifying the driver that the limit control is being executed (Step 1120), when it is determined that the mistaken operation state has not being occurring and that the excessively large operation state has been occurring ("No" at Step 1105, "Yes" at Step 1115); and end the excessively large operation notification and execute the failure notification (Step 1125) at the failure occurrence time point, if it is determined that the mistaken operation state has not being occurring at the failure occurrence time point and that the excessively large operation state has been occurring at the failure occurrence time point ("No" at Step 1110).

According to the thus configured embodiment, both of the limit control and the excessively large notification are executed when the excessively large operation state is occurring. In this case, "a state in which the acceleration of the vehicle is smaller than the driver expected" is likely to be occurring due to the limit control. This may make the driver feel uneasy. However, in the thus configured embodiment, the excessively large operation notification is executed to notify the driver that the limit control is being executed. Hereby, the driver can notice that the above described state is occurring due to the limit control. Consequently, the present control device can lower a possibility that the driver feels uneasy. Furthermore, when the mistaken operation state is not occurring at the failure occurrence time point and the excessively large operation state is occurring at the failure occurrence time point, the present control device ends the excessively large operation notification and starts executing the failure notification at the failure occurrence time point. Hereby, the driver can notices that the control failure has occurred immediately after the control failure has occurred.

In one embodiment of the present disclosure, the vehicle control device further comprises a vehicle speed sensor (12, 10, Step 710, Step 920, Step 940) for measuring a vehicle speed, and the controller is configured to:

calculate a limit acceleration based on the vehicle speed measured by the vehicle speed sensor (Step 925, Step 945);

execute, as the limit control, a control for imposing a limitation on the driving force in such a manner that an actual acceleration of the vehicle is prevented from exceeding the limit acceleration (Step 930); and determine whether or not the control failure has occurred by determining whether or not a failure has occurred in the vehicle speed sensor (Steps 1000 through 1095).

Hereby, the present control device acquires the limit acceleration based on (or varying depending on) the vehicle speed. Therefore, the limit acceleration may be more appropriate so that the present control device can execute the limit control which lowers a possibility that the driver feels uneasy. Furthermore, when the failure occurs in the vehicle speed sensor, the vehicle speed sensor cannot correctly/accurately measure the vehicle speed which the present control device uses for acquiring the limit acceleration. Accordingly, the controller can regards the failure of the vehicle speed sensor as the control failure that the controller cannot execute the limit control.

In one embodiment of the present disclosure, the vehicle control device further comprises a vehicle speed sensor for measuring vehicle speed (12, 10, Step 710), and the controller is configured to:

determine that the mistaken operation state has occurred (Step 445), when at least one of a first case and a second case has occurred, the first case being a case where an accelerator operating state in which the driver is operating the accelerator is occurring at a reverse position changing time point at which the driver has changed a shift position of the vehicle to a reverse position for reversing the vehicle ("Yes" at Step 415, "Yes" at Step 420, "Yes" at Step 435, "Yes" at Step 440), and a second case being a case where the accelerator operating state has occurred during a time period from the reverse position changing time point to a time point at which a predetermined time elapses from the reverse position changing time point ("Yes" at Step 415, "Yes" at Step 420, "Yes" at Step 435, "Yes" at Step 440); and determine that the excessively large operation state has occurred (Step 735), when the shift position of the vehicle is held at the reverse position ("Yes" at Step 720) and the vehicle speed is equal to or higher than a threshold speed ("Yes" at Step 730).

Hereby, the controller can determine more accurately/properly that the mistaken operation state has occurred and that the excessively large operation state has occurred.

In one embodiment of the present disclosure, the vehicle control device further comprises a vehicle speed sensor for measuring a vehicle speed (12, 10, Step 710, Step 920, Step 940), wherein the controller is configured to:

acquire a mistaken operation limit acceleration by applying the vehicle speed measured by the vehicle speed sensor to a predetermined first relationship (MapG(Vs)) between the vehicle speed and the mistaken operation limit acceleration (Step 925), when it is determined that the mistaken operation state has been occurring ("Yes" at Step 915);

execute, as the limit control, a control for imposing a limitation on the driving force in such a manner that an actual acceleration of the vehicle is prevented from exceeding the mistaken operation limit acceleration (Step 930);

acquire an excessively large operation limit acceleration by applying the vehicle speed measured by the vehicle speed sensor to a predetermined second relationship (MapG(Vs)') between the vehicle speed and the excessively large operation limit acceleration (Step 945), when it is determined that the mistaken operation state has not been occurring and the excessively large operation state has been occurring ("No" at Step 915, "Yes" at Step 935); and execute, as the limit control, a control for imposing a limitation on the driving force in such a manner that the actual acceleration of the vehicle is prevented from exceeding the excessively large operation limit acceleration (Step 930), wherein the first relationship and the second relationship have been defined in such a manner that the mistaken operation limit acceleration (G1) for an arbitrary vehicle speed within a range from zero to a predetermined vehicle speed is smaller than the excessively large operation limit acceleration (G1') for the arbitrary vehicle speed.

There is a high possibility that the vehicle may be accelerated in a driver's unexpected/unintended manner when the mistaken operation state is occurring. Such an acceleration of the vehicle is apt to make the driver feel uneasy. According to the thus configured embodiment, the mistaken operation limit acceleration for the arbitrary vehicle speed within the range from zero to the predetermined vehicle speed is smaller than the excessively large operation limit acceleration for the arbitrary vehicle speed within the range from zero to the predetermined vehicle speed. Therefore, the limit control which is executed when the mistaken operation state is occurring imposes a limitation on the driving force in such a manner that the acceleration is prevented from exceeding the limit acceleration which is smaller than the limit acceleration determined and used through the limit control executed when the excessively large operation state is occurring. Accordingly, the present control device can reduce the possibility that the driver feels uneasy.

In the above description, in order to facilitate the understanding of the disclosure, reference symbols used in embodiment of the present disclosure are enclosed in parentheses and are assigned to each of the constituent features of the disclosure corresponding to the embodiment. However, each of the constituent features of the disclosure is not limited to the embodiment as defined by the reference symbols. Other objects, other features, and accompanying advantages of the present disclosure can be readily understood from a description of the embodiments of the present disclosure provided referring to the accompanying drawings.

DETAILED DESCRIPTION

Figure 1:
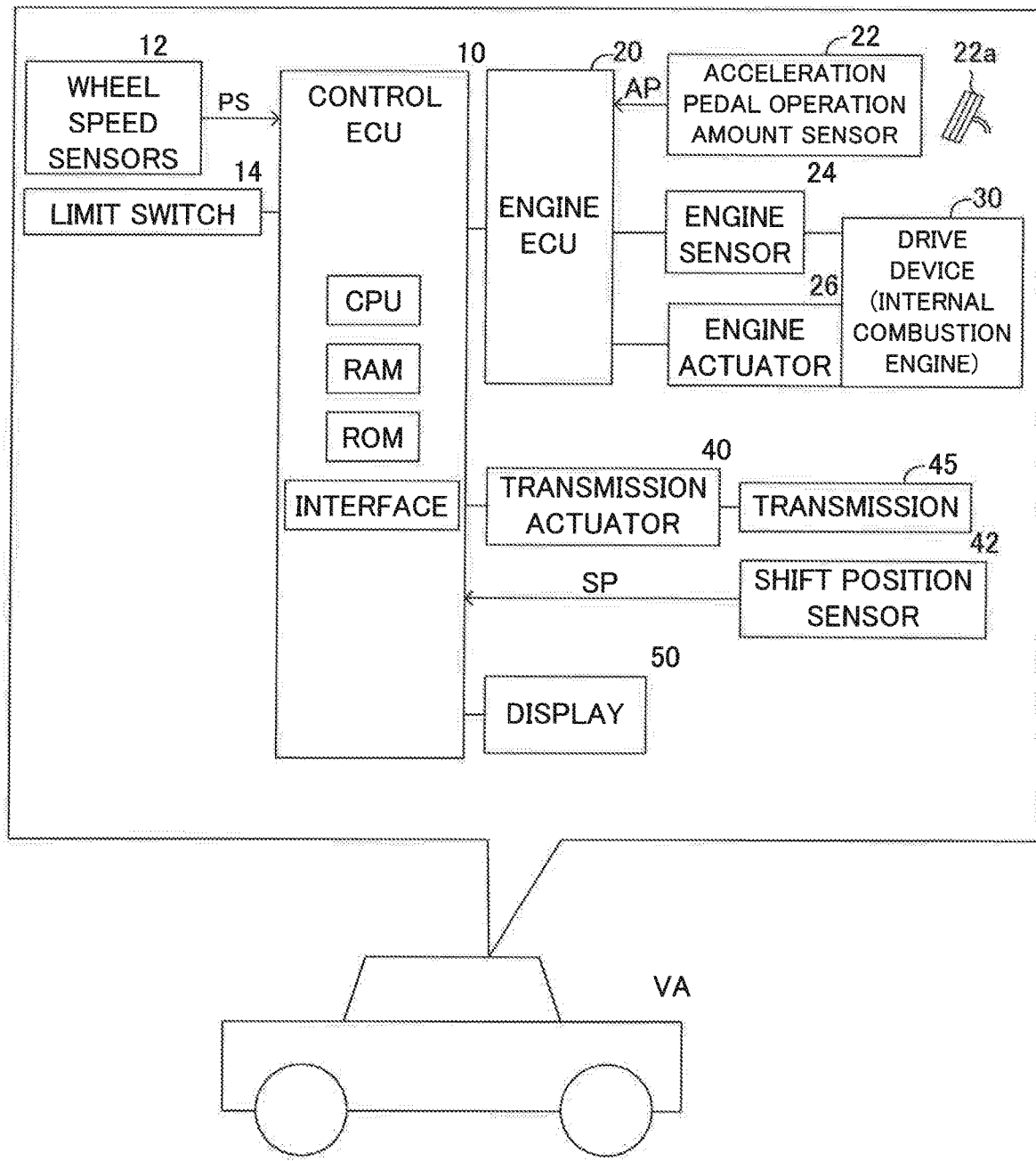
FIG. 1 is a schematic system configuration diagram of a vehicle control device (the present control device) according to an embodiment of the present disclosure.

A vehicle control device (hereinafter, referred to as "the present control device") according to an embodiment of the present disclosure is installed in a vehicle VA (referring to FIG. 1). The present control device comprises a control ECU 10 and an engine ECU 20. The above ECUs are connected to each other via a controller area network (CAN) (not shown) to be able to mutually transmit and receive information to/from those ECUs.

The ECU is an abbreviation of an "Electronic Control Unit". The ECU is an electronic control circuit which includes a microcomputer as a main component. The microcomputer has a CPU, a ROM, a RAM, an interface, and the like. The CPU achieves various functions through executing instructions (routines) stored in the ROM. Some or all of those ECUs may be integrated into a single ECU.

The present control device comprises a plurality of wheel speed sensors 12, a limit switch (an operation unit) 14, an acceleration pedal operation amount sensor 22, an engine sensor 24, an engine actuator 26, a drive device (an internal combustion engine) 30, a transmission actuator 40, a shift position sensor 42, a transmission 45, and a display 50, in addition to the control ECU 10 and the engine ECU 20. As shown in FIG. 1, the wheel speed sensors 12, the limit switch 14, the transmission actuator 40, the shift position sensor 42, and the display 50 are connected to the control ECU 10.

The wheel speed sensors 12 are provided for wheels (a front left wheel, a front right wheel, a rear left wheel, and a rear right wheel) of the vehicle VA, respectively. Each of the wheel speed sensors 12 generates one pulse signal (a wheel pulse signal), when the corresponding wheel rotates by a predetermined angle. The control ECU 10 counts the number of the pulse signals transmitted from each of the wheel speed sensors 12 for/within a predetermined time, and calculates a rotation speed (a wheel speed) of the corresponding wheel based on the counted number of the pulse signals. The control ECU 10 calculates a vehicle speed Vs indicative of a speed of the vehicle VA based on the rotation speeds of the wheels. For example, the control ECU 10 calculates the average of the rotation speeds of the four wheels as the vehicle speed Vs. When the vehicle VA is traveling not only forward but also backward, the vehicle speed Vs is calculated so as to be a positive value which becomes larger as a magnitude of the vehicle speed becomes larger.

The limit switch 14 is a switch to be operated by the driver when the driver requests the control ECU 10 to allow an execution of a limit control described later or to prohibit the execution of the limit control. In a case where the limit switch 14 is being held at an on position, the limit switch 14 moves to an off position when the driver operates the limit switch 14. In a case where the limit switch 14 is being held at the off position, the limit switch 14 moves to the on position when the driver operates the limit switch 14. The limit switch 14 remains at the same position unless the driver operates the limit switch 14.

The limit switch 14 transmits a signal (an allowing request signal) indicating that the driver requests the control ECU 10 to allow the execution of the limit control (an allowing request) to the control ECU 10, when the limit switch 14 is being held at the off position. The limit switch 14 transmits a signal (a prohibiting request signal) indicating the driver requests the control ECU 10 to prohibit the execution of the limit control (a prohibiting request) to the control ECU 10, when the limit switch 14 is being held at the on position.

The engine ECU 20 is connected to the acceleration pedal operation amount sensor 22 and the engine sensor 24. The engine ECU 20 receives detection signals from these sensors.

The acceleration pedal operation amount sensor 22 measures an operation amount of an acceleration pedal 22a of the vehicle VA (that is, an acceleration pedal operation amount AP) to transmit a detection signal indicative of the acceleration pedal operation amount AP to the engine ECU 20. The acceleration pedal 22a is an operator which the driver operates in order to increase driving force generated by the drive device (the internal combustion engine in the present example) 30 of the vehicle VA.

The acceleration pedal operation amount AP is "0" when the driver does not operate the acceleration pedal (that is, when the driver does not step on the acceleration pedal 22a). The acceleration pedal operation amount AP increases as a stepping amount of the acceleration pedal 22a increases.

The engine ECU 20 transmits, to the DSECU 10, the detection signal which the engine ECU 20 receives from the acceleration pedal operation amount sensor 22. The control ECU 10 receives the detection signal from the engine ECU 20 so as to obtain the acceleration pedal operation amount AP.

The engine sensors 24 measure various driving state amounts of the internal combustion engine 30. For example, the engine sensors 24 include a throttle valve opening degree sensor, an engine rotation speed sensor, and an air intake amount sensor.

Furthermore, the engine ECU 20 is connected to engine actuators 26. For example, the engine actuators 26 include a throttle valve actuator and fuel injectors. The engine ECU 20 changes torque generated by the internal combustion engine 30 through driving the engine actuators 26, so as to adjust the driving force acting on the vehicle VA.

The engine ECU 20 determines a normal target throttle valve opening degree TAtgt based on the vehicle speed Vs and the acceleration pedal operation amount AP. The engine ECU 20 controls the engine actuator 26 in such a manner that an actual throttle valve opening degree TA becomes equal to the normal target throttle valve opening degree TAtgt. Hereby, the driving force acts on the vehicle VA.

Furthermore, the control ECU 10 is connected to the transmission actuator 40 and the shift position sensor 42.

The transmission actuator 40 is configured to change a transmission stage of the transmission 45 of the vehicle VA. The control ECU 10 determines the transmission stage based on the vehicle speed Vs, the acceleration pedal operation amount AP, and a shift position SP. The shift position SP means a position of an unillustrated shift lever operated by the driver. Thereafter, the control ECU 10 transmits a driving signal to the transmission actuator 40 in order to have the transmission actuator 40 achieve the determined transmission stage. For example, the control ECU 10 controls the transmission actuator 40 in such a manner that the transmission actuator 40 sets the transmission stage of the transmission 45 to a transmission stage to reverse the vehicle VA, when the shift position SP is changed to a reverse position (a position of a reverse range "R").

The shift position sensor 42 detects the shift position SP. The shift position sensor 42 transmits, to the control ECU 10, a signal indicative of the detected shift position SP. The shift position SP is any one of a position of a parking range "P" (a parking position P), a position of a driving range "D" (a driving position D), a position of a reverse range "R" (the reverse position R), a position of a neutral range "N" (a neutral position N), and the like.

The control ECU 10 is connected to the display 50. The display 50 is a head-up display (hereinafter, referred to as "a HUD"). The display 50 (the HUD) receives a display signal from the control ECU 10 to display "display information" indicated by the received display signal on a partial area of a windshield of the vehicle VA. The display 50 may be a liquid crystal display.

(Outline of Operation)

The control ECU 10 determines whether or not a mistaken operation state is occurring. The mistaken operation state is a state in which the driver operates the acceleration pedal 22a with mistaking the acceleration pedal 22a for another driving operator (e.g. an unillustrated brake pedal). In other words, the mistaken operation state is a state in which the driver steps on the acceleration pedal 22a by mistake. Hereinafter, the mistaken operation state is referred to as "a mistaken stepping state".

The control ECU 10 also determines whether or not an excessively large operation state is occurring. The excessively large operation state is a state in which the driver operates the acceleration pedal 22a in such a manner that the acceleration pedal operation amount AP becomes excessively large. In other words, the excessively large operation state is a state in which the driver steps on the acceleration pedal 22a excessively largely/deeply. Hereinafter, the excessively large operation state is referred to as "an excessively large stepping state".

When at least one of the mistaken stepping state and the excessively large stepping state is occurring, the control ECU 10 determines that a predetermined condition is satisfied to execute a limit control. The control ECU 10 controls the driving force of the vehicle VA (or impose a limitation on the driving force) so as to prevent an actual acceleration Ga from exceeding a limit acceleration Glmt through the limit control.

The control ECU 10 executes a notification for urging the driver to end/stop/terminate operating the acceleration pedal 22a by mistake, while the mistaken stepping state is occurring (that is, during a mistaken stepping time period). Hereinafter, such a notification may be referred to as "a mistaken stepping notification". Whereas, the control ECU 10 executes a notification for notifying the driver that the limit control is being executed, while the excessively large stepping state is occurring (that is, during an excessively large stepping time period). Hereinafter, such a notification may be referred to as "an excessively large stepping notification".

At a time point (referred to as "a failure occurrence time point") that an execution impossible failure (may referred to a control failure) occurs, the control ECU 10 executes a notification according to one of modes/manners different from each other depending on whether or not the mistaken stepping state has been occurring. In other words, the mode of the notification executed when the mistaken stepping state has been occurring at the failure occurrence time point is different from the mode of the notification executed when the mistaken stepping state has not been occurring at the failure occurrence time point. The execution impossible failure is a failure (control failure) that the limit control cannot be executed (or a failure which disables the limit control).

More specifically, at the failure occurrence time point, the control ECU 10 continues executing the mistaken stepping notification when the mistaken stepping state has already been occurring. Whereas, at the failure occurrence time point, the control ECU 10 executes a notification (hereinafter, referred to as "a failure notification") for notifying the driver that the execution impossible failure is occurring when the mistaken stepping state has not occurred.

While the mistaken stepping state is occurring, there is a high possibility that the driver is stepping/pressing the acceleration pedal 22a by mistake, even though the driver has an intention of stepping/pressing an unillustrated brake pedal. Accordingly, the vehicle VA has a high possibility of being accelerated in a driver's unexpected/unintended manner (or not in an intended manner of the driver). Such an unintentional acceleration of the vehicle VA is apt to make the driver feel uneasy. Therefore, the driver needs to end/stop stepping the acceleration pedal 22a by mistake as soon as possible. In view of the above, at the failure occurrence time point, the control ECU 10 continues executing the mistaken stepping notification without starting to execute the failure notification if the mistaken stepping state has been occurring. Accordingly, the control ECU 10 continues executing the mistaken stepping notification at and after the failure occurrence time point, so that the possibility of causing the driver to end/stop stepping the acceleration pedal 22a is not be lowered.

Whereas, at the failure occurrence time point, the control ECU 10 notifies the driver that the execution impossible failure is occurring, if the mistaken stepping state has not been occurring. Accordingly, at the failure occurrence time point, the control ECU 10 ends executing the excessively large stepping notification and starts executing the failure notification, if the excessively large step has been occurring.

(Operation Example)

Figure 2:
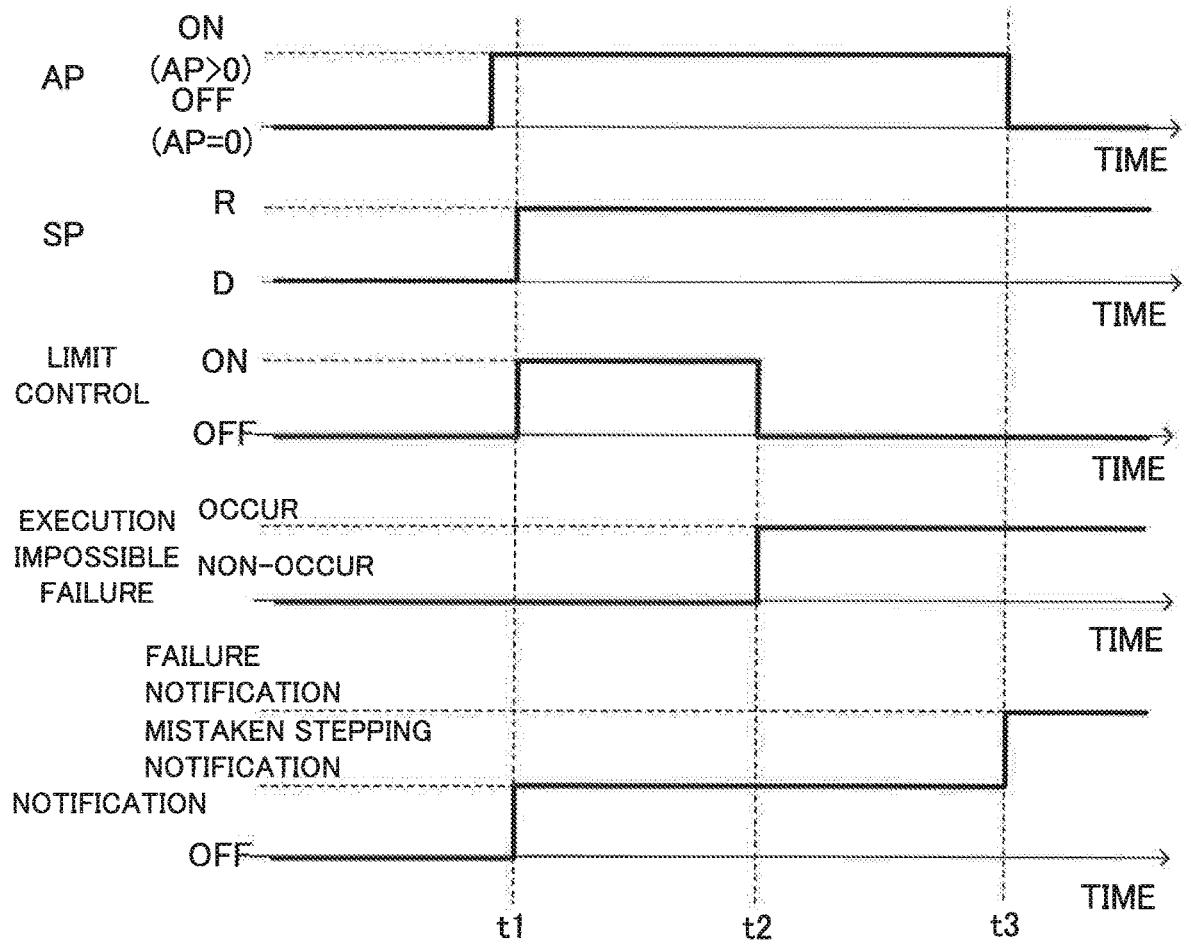
FIG. 2 is a timing chart for illustrating a process executed by the present control device when a mistaken stepping state occurs at a failure occurrence time point.

An example of operations of the present control device in a case where the mistaken stepping state has been occurring at the failure occurrence time point will next be described with reference to FIG. 2. First, a mistaken stepping determination process and a mistaken stepping end process will be described.

<Mistaken Stepping Determination Process>

The control ECU 10 determines that the mistaken stepping state occurs when at least one of conditions A1 and A2 described below becomes satisfied.

A1: At least one of a first case and a second case has occurred. The first case is a case where the acceleration pedal operation amount AP is larger than "0" at a reverse position change time point at which the shift position SP is changed from a position other than the reverse position R to the reverse position R. The second case is a case where the acceleration pedal operation amount AP is larger than "0" at any time in a determination time period. The determination time period is a time period from the reverse position change time point to a time point at which a predetermined time elapses from the reverse position change time point. It should be noted that the acceleration pedal operation amount AP is larger than "0" when the acceleration pedal 22a is being operated.

A2: An acceleration pedal operation speed APV is equal to or higher than a threshold speed APVth. The acceleration pedal operation speed APV is an increase amount of the acceleration pedal operation amount AP per unit time.

<Mistaken Stepping End (Determination) Process>

The control ECU 10 determines that "the mistaken stepping state which has been determined to be occurred by the control ECU 10 when the condition A1 became satisfied" ends, when either one of conditions B1 and B2 described below becomes satisfied.

B1: The shift position SP is changed to any one of positions other than the reverse position R.

B2: The acceleration pedal operation amount AP becomes "0".

The control ECU 10 determines that "the mistaking state which has been determined to be occurred by the control ECU 10 when the condition A2 became satisfied" ends, when the condition B2 becomes satisfied.

<Time Point t1>

At a time point t1 in an example shown in FIG. 2, the control ECU 10 executes operations 1 through 3 described below.

Operation 1: The control ECU 10 determines that the mistaken stepping state occurs.

Operation 2: The control ECU 10 starts executing the limit control.

Operation 3: The control ECU 10 starts executing the mistaken stepping notification.

Regarding to the Operation 1

At the time point t1, the driver changes the shift position SP from the driving positon D to the reverse positon R. The driver has been stepping on the acceleration pedal 22a since a time point before the time point t1, and, thus, the acceleration pedal operation amount AP is larger than "0" at the time point t1. Accordingly, the condition A1 is satisfied at the time point t1, because the acceleration pedal operation amount AP is larger than "0" in the determination time period. Consequently, the control ECU 10 determines that the mistaken stepping state has occurred at the time point t1.

Regarding to the Operation 2

At the time point t1, the control ECU 10 starts executing the limit control, since the control ECU 10 determines that the mistaken stepping state has occurred.

<Limit Control>

In the limit control executed while the mistaken stepping state is occurring, the control ECU 10 refers to a mistaken stepping acceleration lookup table MapG(Vs) described later to acquire an acceleration G corresponding to the vehicle speed Vs as the limit acceleration Glmt (Step 925 shown in FIG. 9). Thereafter, the control ECU 10 transmits the limit acceleration Glmt to the engine ECU 20.

The engine ECU 10 receives a signal indicative of the vehicle speed Vs from the control ECU 10, every time a predetermined time elapses. The engine ECU 10 calculates, as the actual acceleration Ga, a change amount of the vehicle speed Vs per unit time (=a vehicle speed at the present time point—a vehicle speed at a time point the unit time before the present time point). The engine ECU 20 determines a limit target throttle valve opening degree TAtgt' in such a manner that the actual acceleration Ga becomes equal to the limit acceleration Glmt, when the actual acceleration Ga is larger than the received limit acceleration Glmt. Thereafter, the engine ECU 20 controls the engine actuators 26 in such a manner that the actual throttle valve opening degree TA becomes equal to the limit target throttle valve opening degree TAtgt'.

Accordingly, through the limit control executed while the mistaken stepping state is occurring, "the driving force which is acted on the vehicle VA due to a mistaken stepping" is limited so that the driving force is prevented from becoming excessive large, when the actual acceleration Ga is larger than the limit acceleration Glmt.

Regarding to the Operation 3

At the time point t1, the control ECU 10 starts executing the mistaken operation notification with starting executing the limit control. More specifically, the control ECU 10 displays, on the display 50, a message for urging the driver to end/stop operating the acceleration pedal 22a (e.g. the message of "Please release your foot from the acceleration pedal").

<Time Point t2>

At a time point t2, the control ECU 10 detects the execution impossible failure. For example, when a failure of the wheel speed sensors 12 occurs (the failure occurs in the wheel speed sensors 12), the control ECU 10 detects the failure as the execution impossible failure. A method for detecting the failure of the wheel speed sensors 12 will be described later, although the method is a well-known method (referring to Japanese Patent Application Laid-Open 2017-114145).

The control ECU 10 cannot accurately/correctly acquire the vehicle speed Vs while the failure of the wheel speed sensors 12 is occurring. Therefore, the control ECU 10 can accurately/correctly acquire neither the limit acceleration Glmt nor the actual acceleration Ga. Accordingly, the control ECU 10 cannot execute the limit control using the accurate/correct limit acceleration Glmt. Therefore, the control ECU 10 ends executing the limit control at the time point t2 that the execution impossible failure occurs.

Furthermore, at the time point t2, the control ECU 10 continues executing the mistaken operation notification which was started at the time point t1 without starting executing the failure notification, because the mistaken stepping state has occurred at the time point t2.

<Time Point t3>

Thereafter, the condition B1 becomes satisfied at a time point t3, because the acceleration pedal operation amount AP becomes "0" at the time point t3. Therefore, the control ECU 10 determines that the mistaken operation state ends at the time point t3. When the control ECU 10 determines that the mistaken operation state ends, the control ECU 10 starts executing the failure notification. More specifically, the control ECU 10 displays, on the display 50, a message representing that the limit control cannot be executed due to an occurrence of the execution impossible failure.

An example of operations of the present control device in a case where the mistaken stepping state has not been occurring and the excessively large stepping state has been occurring at the failure occurrence time point will next be described with reference to FIG. 3. First, an excessively large step determination process and an excessively large step end (determination) process are described.

<Excessively Large Stepping State Determination Process>

The control ECU 10 determines that the excessively large stepping state has occurred when a condition C1 described below becomes satisfied.

C1: The shift position SP is held at the reverse position R, and the vehicle speed Vs is equal to or higher than the threshold speed Vsth.

<Excessively Large Stepping State End (Determination) Process>

The control ECU 10 determines that the excessively large stepping state ends when either one of conditions D1 and D2 described below becomes satisfied.

D1: The shift position SP is changed to any one of positions other than the reverse position R.

D2: The acceleration pedal operation amount AP becomes "0".

<Time Point t4>

Figure 3:
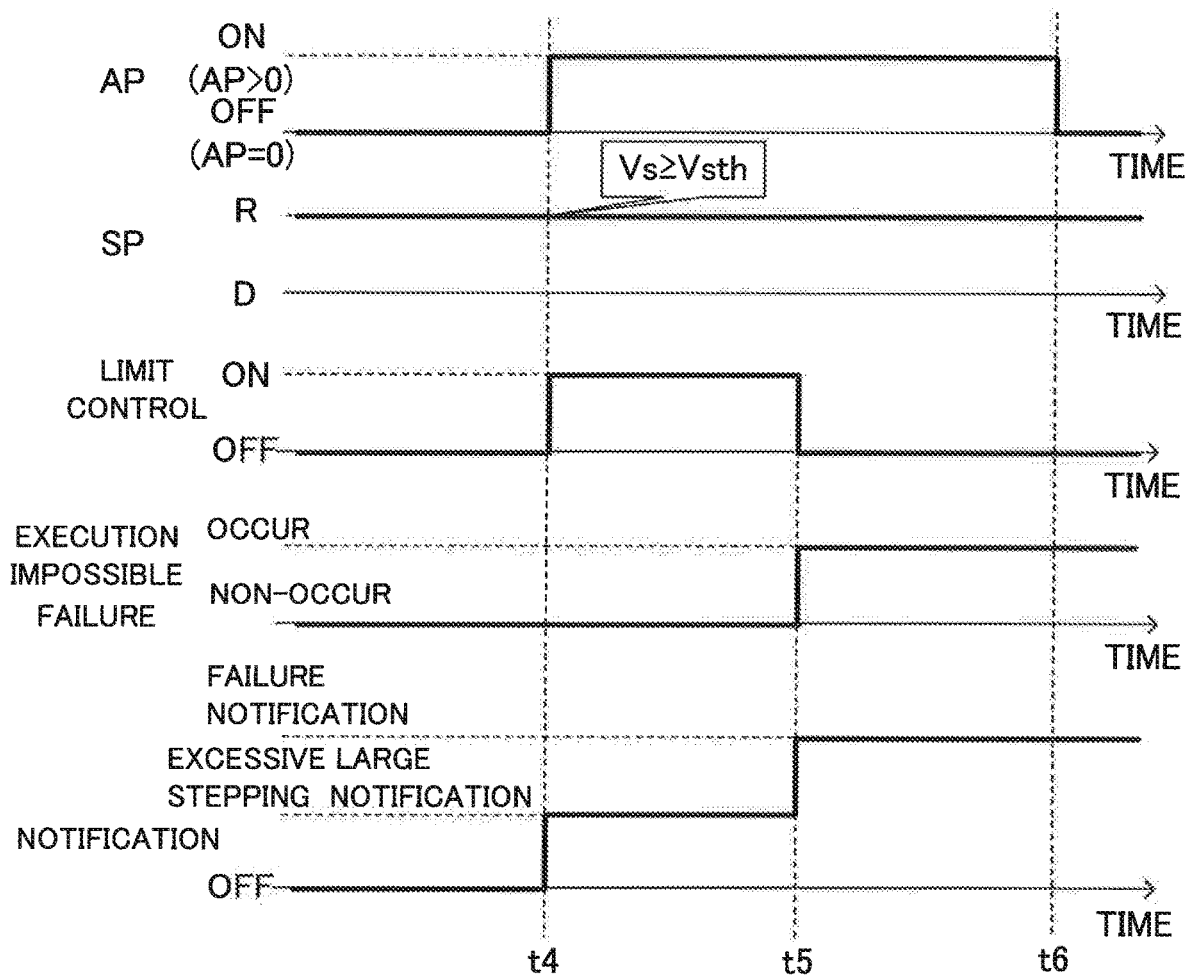
FIG. 3 is a timing chart for illustrating a process executed by the present control device when the mistaken stepping state does not occurs and an excessive large step state occurs at a failure occurrence time point.

At a time point t4 in an example shown in FIG. 3, the control ECU 10 determines that the excessively large stepping state has occurred, because the condition C1 becomes satisfied. The control ECU 10 starts executing the limit control when the excessively large stepping state has occurred. In the limit control, the control ECU 10 refers to an excessively large step acceleration lookup table MapG (Vs)' to acquire the acceleration G corresponding to the vehicle speed Vs as the limit acceleration Glmt (Step 945 shown in FIG. 9). Through the limit control executed while the excessively large stepping state is occurring, "the driving force which is acted on the vehicle VA due to an excessively large stepping" is limited so that the driving force is prevented from becoming excessive large, when the actual acceleration Ga is larger than the limit acceleration Glmt. Furthermore, the control ECU 10 starts executing the excessively large stepping notification. More specifically, the control ECU 10 displays, on the display 50, a message representing that the limit control is being executed due to an occurrence of the excessively large stepping state.

<Time Point t5>

At a time point t5, the control ECU 10 detects the execution impossible failure and ends executing the limit control. Furthermore, at the time point t5, the control ECU 10 ends executing the excessively large stepping notification and starts executing the failure notification, because the mistaken stepping state has not been occurring at the time point t5.

<Time Point t6>

The control ECU 10 determines that the excessively large stepping state ends at a time point t6, because the acceleration pedal operation amount AP becomes "0" so that the condition D2 becomes satisfied at the time point t6. It should be noted that the control ECU 10 continues executing the failure notification until the execution impossible failure ends after the time point t6.

(Specific Operation)

<First Mistaken Stepping Determination Routine>

The CPU of the control ECU 10 (hereinafter, the term "CPU" means the CPU of the control ECU 10 unless otherwise specified) is configured to execute a routine (a first mistaken stepping determination routine) represented by a flowchart shown in FIG. 4, every time a predetermined time elapses.

Figure 4:
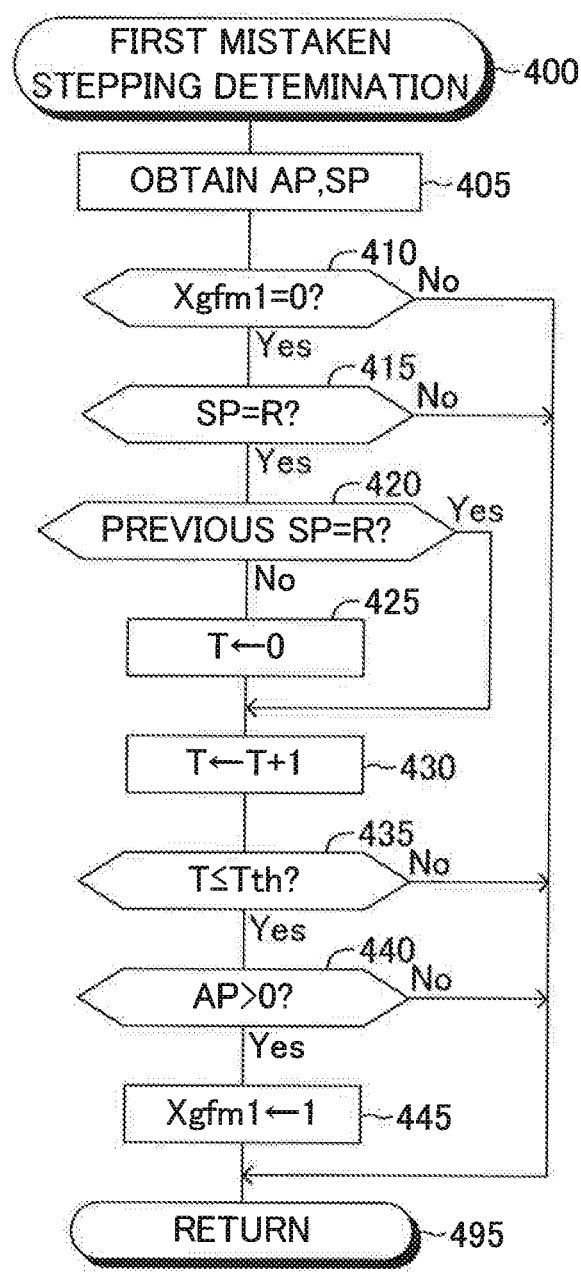
FIG. 4 is a flowchart illustrating a routine executed by a CPU of a control ECU illustrated in FIG. 1.

When a predetermined timing has come, the CPU starts processes from Step 400 shown in FIG. 4, and executes Step 405 and proceeds to Step 410.

Step 405: The CPU obtains the acceleration pedal operation amount AP measured by the acceleration pedal operation amount sensor 22 and the shift position SP detected by the shift position sensor 42.

The engine ECU 20 obtains the acceleration pedal operation amount AP from the acceleration pedal operation amount sensor 22, every time a predetermined time elapses. The CPU obtains/receives, from the engine ECU 20, the acceleration pedal operation amount AP obtained by the engine ECU 20.

Step 410: The CPU determines whether or not a value of a first mistaken stepping flag Xgfm1 is "0".

The value of the first mistaken stepping flag Xgfm1 is set to "1", when the condition A1 becomes satisfied so that it is determined that the mistaken stepping state has occurred. The value of the first mistaken stepping flag Xgfm1 is set to "0", when either one of the conditions B1 and B2 becomes satisfied so that it is determined that the mistaken stepping state ends. The control ECU 10 sets the value of the first mistaken stepping flag Xgfm1 to "0" through an initialization routine which the CPU executes when the driver performs an operation for changing a position of an ignition key switch (not shown) of the vehicle VA from an off-position to an on-position.

When the value of the first mistaken stepping flag Xgfm1 is "0", the CPU makes a "Yes" determination at Step 410, and proceeds to Step 415. At Step 415, the CPU determines whether or not the shift position SP is held at the reverse position R.

When the shift position SP is held at the reverse position R, the CPU makes a "Yes" determination at Step 415, and proceeds to Step 420. At Step 420, the CPU determines whether or not a previous shift position SP was held at the reverse position R.

When the previous shift position SP was not held at the reverse position R, that is, when the previous shift position SP was held at any one of the positions other than the reverse position R, the CPU makes a "No" determination at Step 420. Thereafter, the CPU executes Steps 425 and 430 in that order, and proceeds to Step 435.

Step 425: The CPU sets a timer T to "0" to initialize the timer T.

Step 430: The CPU adds "1" to the timer T.

The timer T is a timer for measuring/counting a time which elapses from a start time point at which the driver changes the shift position SP from any one of the positions other than the reverse position R to the reverse position R. That is, the start time point is a start time point of the above described determination time period.

Step 435: The CPU determines whether or not the timer T is equal to or smaller than a threshold Tth.

The threshold Tth has been set to a value corresponding to a value of the timer T of when the predetermined time elapses from the start time point (the threshold Tth corresponds a length of the above described determination time period).

When the timer T is equal to or smaller than the threshold Tth, that is, when the predetermined time has not elapsed yet from the start time point so that the present time point is in the determination time period, the CPU makes a "Yes" determination at Step 435, and proceeds to Step 440. At Step 440, the CPU determines whether or not the acceleration pedal operation amount AP is larger than "0" (that is, whether or not the driver steps on the acceleration pedal 22a).

Assuming that the driver has changed the shift position SP from any one of the positions (any one of the neutral position N, the parking position P, and the driving position D) other than the reverse position R to the reverse position R while the driver is stepping on the acceleration pedal 22a, the condition A1 becomes satisfied. Accordingly, when the CPU proceeds to Step 440, the CPU makes a "Yes" determination at Step 440, and proceeds to Step 445.

At Step 445, the CPU sets the value of the first mistaken stepping flag Xgfm1 to "1". Thereafter, the CPU proceeds to Step 495 to tentatively terminate the present routine. Consequently, the value of the first mistaken stepping flag Xgfm1 is set to "1" in this case.

Whereas, assuming that the driver has not stepped on the acceleration pedal 22a at the reverse position change time point at which the driver changes the shift position SP from the position other than the reverse position R to the reverse position R, the condition A1 does not become satisfied. In this case, when the CPU proceeds to Step 440, the CPU makes a "No" determination at Step 440, and proceeds to Step 495 to tentatively terminate the present routine. Consequently, the value of the first mistaken stepping flag Xgfm1 remains at "0" in this case.

When the CPU executes the present routine successively thereafter and proceeds to Step 420, the CPU makes a "Yes" determination at Step 420, and proceeds to Step 430 directly without executing Step 425, because the previous shift position SP was held at the reverse position R. The CPU adds "1" to the timer T at Step 430, and proceeds to Step 435. Assuming that the timer T is equal to or smaller than the threshold Tth, the CPU makes a "Yes" determination at Step 435, and proceeds to Step 440.

Assuming that the acceleration pedal operation amount AP is larger than "0" when the CPU proceeds to Step 440, the condition A1 becomes satisfied, because the driver has stepped on the acceleration pedal 22a in the determination time period from the reverse position change time point to the time point at which the predetermined time elapses from the reverse position change time point. In this case, the CPU makes a "Yes" determination at Step 440, and proceeds to Step 445 to set the value of the first mistaken stepping flag Xgfm1 to "1". Thereafter, the CPU proceeds to Step 495 to tentatively terminate the present routine. Consequently, in this case, the value of the first mistaken stepping flag Xgfm1 is set to "1".

When the CPU executes the present routine successively thereafter and proceeds to Step 410, the CPU makes a "No" determination at Step 410, and proceeds to Step 495 to tentatively terminate the present routine, because the value of the first mistaken stepping flag Xgfm1 has been set to "1". Consequently, the value of the first mistaken stepping Xgfm1 remains at "1".

Whereas, when the CPU proceeds to Step 415, the CPU makes a "No" determination at Step 415, and proceeds to Step 495 to tentatively terminate the present routine, if the shift position SP is held at the position other than the reverse position R.

Whereas, when the CPU proceeds to Step 435, the CPU makes a "No" determination at Step 435, and proceeds to Step 495 to tentatively terminate the present routine, if the timer T is larger than the threshold Tth (that is, if the driver has not stepped on the acceleration pedal 22a before the determination time period has elapses).

<Second Mistaken Stepping Determination Routine>

Figure 5:
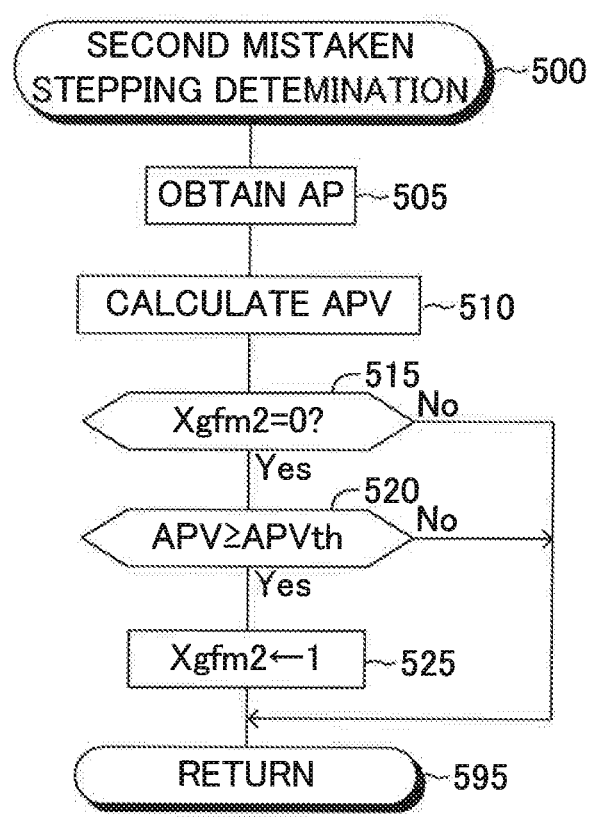
FIG. 5 is a flowchart illustrating a routine executed by the CPU of the control ECU illustrated in FIG. 1.

The CPU is configured to execute a routine (a second mistaken stepping determination routine) represented by a flowchart shown in FIG. 5, every time a predetermined time elapses.

When a predetermined timing has come, the CPU starts processes from Step 500 shown in FIG. 5, and executes Steps 505 and 510 in that order to proceed to Step 515.

Step 505: The CPU obtains the acceleration pedal operation amount AP.

Step 510: The CPU acquires/calculates the acceleration pedal operation speed APV.

More specifically, the CPU acquires a subtraction value dAP by subtracting the acceleration pedal operation amount AP previously obtained (i.e., the amount AP at a time point the predetermined time dt before the present time point) from the acceleration pedal operation amount AP obtained at the present time point. Thereafter, the CPU acquires the acceleration pedal operation speed APV by dividing the subtraction value dAP by the predetermined time dt which is an execution interval of the present routine.

Step 515: The CPU determines whether or not a value of a second mistaken stepping flag Xgfm2 is "0".

The value of the second mistaken stepping flag Xgfm2 is set to "1", when the above described condition A2 becomes satisfied so that it is determined that the mistaken stepping state occurs. The value of the second mistaken stepping flag Xgfm2 is set to "0", when the above described condition B2 becomes satisfied so that it is determined that "the mistaken stepping state due to the satisfaction of the condition A2" ends. The control ECU 10 sets the value of the second mistaken stepping flag Xgfm2 to "0" through the above described initialization routine.

When the value of the second mistaken stepping flag Xgfm2 is "0", the CPU makes a "Yes" determination at Step 515, and proceeds to Step 520. At Step 520, the CPU determines whether or not the acceleration pedal operation speed APV is equal to or higher than a threshold speed APVth.

When the acceleration pedal operation speed APV is lower than the threshold speed APVth, the condition A2 is not satisfied. Therefore, the CPU makes a "No" determination at Step 520, and proceeds to Step 595 to tentatively terminate the present routine. Consequently, the value of the second mistaken stepping flag Xgfm2 remains at "0".

Whereas, when the CPU proceeds to Step 520, the condition A2 becomes satisfied, if the acceleration pedal operation speed APV is equal to or higher than the threshold speed APVth. In this case, the CPU makes a "Yes" determination at Step 520, and proceeds to Step 525. At Step 525, the CPU sets the value of the second mistaken stepping flag Xgfm2 to "1", and proceeds to Step 595 to tentatively terminate the present routine. Consequently, the value of the second mistaken stepping flag Xgfm2 is set to "1".

Whereas, when the CPU proceeds to Step 515, the CPU makes a "No" determination at Step 515, and proceeds to Step 595 to tentatively terminate the present routine, if the value of the second mistaken stepping flag Xgfm2 is "1". Consequently, in this case, the value of the second mistaken stepping flag Xgfm2 remains at "1".

<Mistaken Stepping End Determination Routine>

Figure 6:
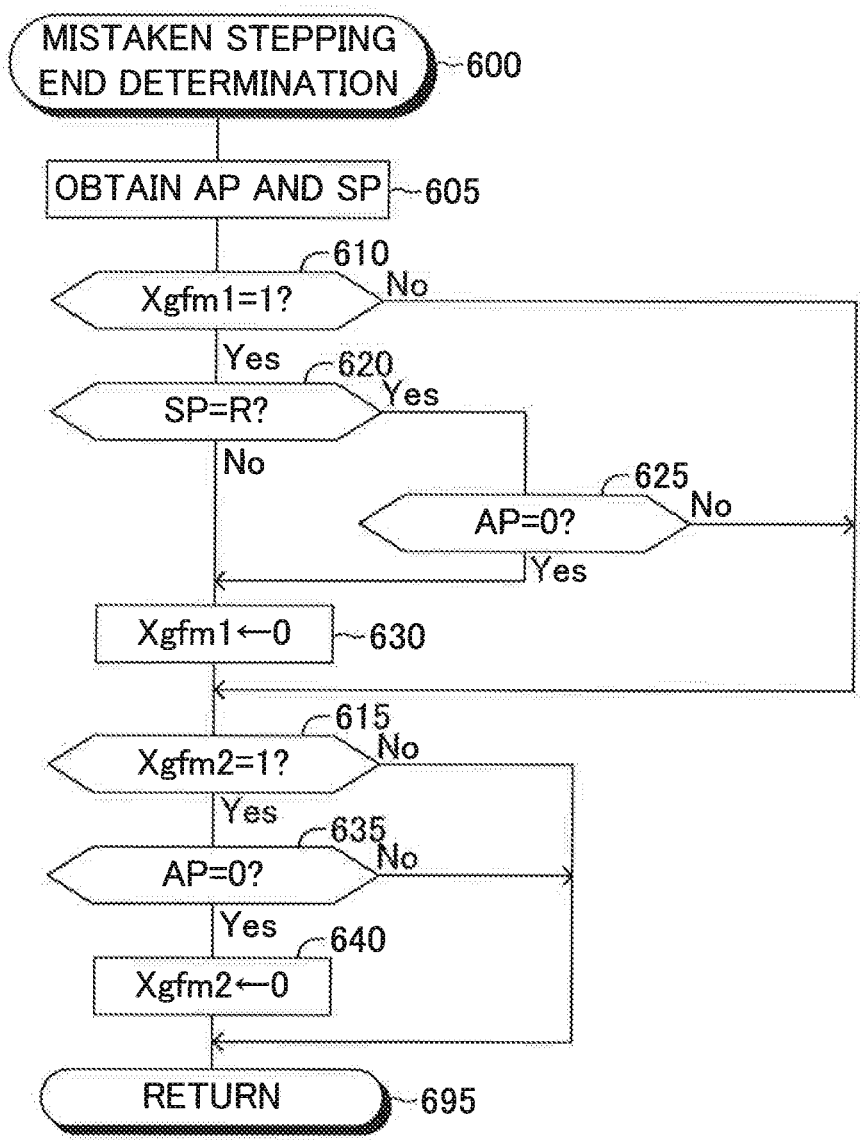
FIG. 6 is a flowchart illustrating a routine executed by the CPU of the control ECU illustrated in FIG. 1.

The CPU is configured to execute a routine (a mistaken stepping end determination routine) represented by a flowchart shown in FIG. 6, every time a predetermined time elapses.

When a predetermined timing has come, the CPU starts processes from Step 600 shown in FIG. 6, and executes Step 605 to proceed to Step 610.

Step 605: The CPU obtains the acceleration pedal operation amount AP and the shift position SP.

Step 610: The CPU determines whether or not the value of the first mistaken stepping flag Xgfm1 is "1".

When the value of the first mistaken stepping flag Xgfm1 is "0", the CPU makes a "No" determination at Step 610, and proceeds to Step 615. At Step 615, the CPU determines whether or not the value of the second mistaken stepping flag Xgfm2 is "1". When the value of the second mistaking flag Xgfm2 is "0", the CPU makes a "No" determination at Step 615, and proceeds to Step 695 to tentatively terminate the present routine.

It is assumed that the value of the first mistaken stepping flag Xgfm1 is "1" and that the second mistaken stepping flag Xgfm2 is "0", when the present routine is executed. In this case, when the CPU proceeds to Step 610, the CPU makes a "Yes" determination at Step 610, and proceeds to Step 620, because the value of the first mistaken stepping flag Xgfm1 is "1".

At Step 620, the CPU determines whether or not the shift position SP is held at the reverse position R. When the shift position SP is held at the reverse position R, the condition B1 is not satisfied. In this case, the CPU makes a "Yes" determination at Step 620, and proceeds to Step 625.

At Step 625, the CPU determines whether or not the acceleration pedal operation amount AP is "0". When the acceleration pedal operation amount AP is larger than "0", the above described condition B2 is not satisfied. In this case, the CPU makes a "No" determination at Step 625, and proceeds to Step 615. According to the above assumption, the value of the second mistaken stepping flag Xgfm2 is "0". Therefore, the CPU makes a "No" determination at Step 615, and proceeds to Step 695 to tentatively terminate the present routine. In this manner, when neither the condition B1 nor the condition B2 becomes satisfied, the value of the first mistaken stepping flag Xgfm1 remains at "1".

Whereas, when the CPU proceeds to Step 620, the CPU makes a "No" determination at step 620, and proceeds to Step 630, if the shift position SP is held at the position other than the reverse position R (that is, if the above described condition B1 becomes satisfied). At step 630, the CPU sets the value of the first mistaken stepping flag Xgfm1 to "0", and proceeds to Step 615.

Whereas, when the CPU proceeds to Step 625, the CPU makes a "Yes" determination at Step 625, if the acceleration pedal operation amount AP is "0" (that is, if the above described condition B2 becomes satisfied). Thereafter, the CPU proceeds to Step 630 to set the value of the first mistaken stepping flag Xgfm1 to "0", and proceeds to Step 615.

It is assumed that the value of the first mistaken stepping flag Xgfm1 is "0" and that the value of the second mistaken stepping flag Xgfm2 is "1". In this case, when the CPU proceeds to Step 610, the CPU makes a "No" determination at Step 610, and proceeds to Step 615, because the value of the first mistaken stepping flag Xgfm1 is "0". The CPU makes a "Yes" determination at Step 615, and proceeds to Step 635, because the value of the second mistaken stepping flag Xgfm2 is "1".

At Step 635, the CPU determines whether or not the acceleration pedal operation amount AP is "0". When the acceleration pedal operation amount AP is larger than "0", the CPU makes a "No" determination at Step 635, and proceeds to Step 695 to tentatively terminate the present routine.

Whereas, when the CPU proceeds to Step 635, the CPU makes a "Yes" determination at Step 635, and proceeds to Step 640, if the acceleration pedal operation amount AP is "0" (that is, if the above described condition B2 becomes satisfied). At Step 640, the CPU sets the value of the second mistaken stepping flag Xgfm2 to "0", and proceeds to Step 695 to tentatively terminate the present routine.

<Excessively Large Stepping Determination Routine>

Figure 7:
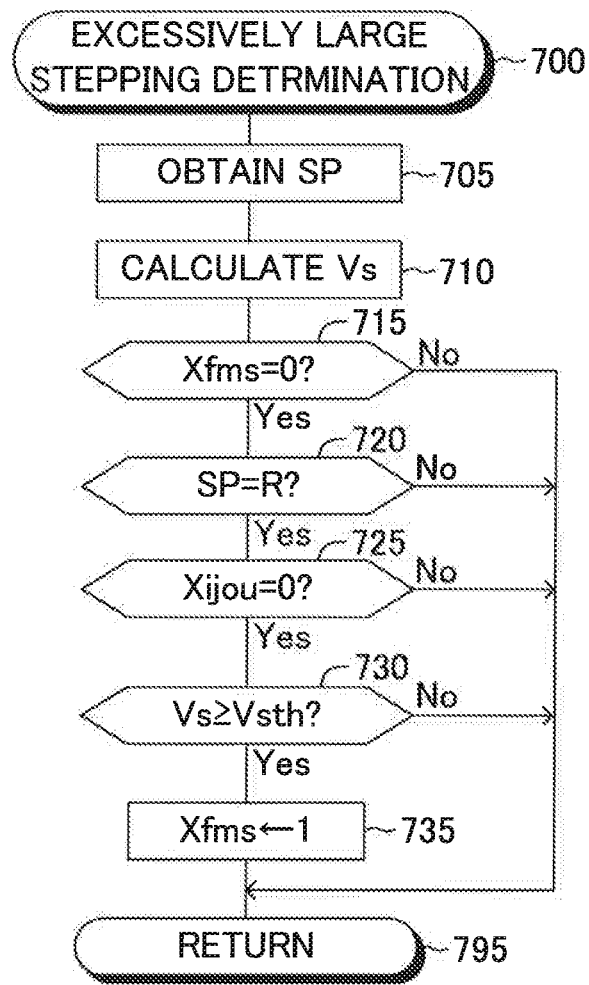
FIG. 7 is a flowchart illustrating a routine executed by the CPU of the control ECU illustrated in FIG. 1.

The CPU is configured to execute a routine (an excessively large stepping determination routine) represented by a flowchart shown in FIG. 7, every time a predetermined time elapses.

When a predetermined timing has come, the CPU starts processes from Step 700 shown in FIG. 7, and executes Steps 705 and 710 in that order to proceed to Step 715.

Step 705: The CPU obtains the shift position SP.

Step 710: The CPU acquires/calculates the rotation speed of each of the wheels based on the wheel pulse signals from the corresponding wheel speed sensor 12 to acquire/calculate the average of the rotation speeds of the wheels as the vehicle speed Vs.

Step 715: The CPU determines whether or not a value of an excessively large stepping flag Xfms is "0".

The value of the excessively large stepping flag Xfms is set to "1", when the above described condition C1 becomes satisfied so that it is determined that the excessively large stepping state has occurred. The value of the excessively large stepping flag Xfms is set to "0", when either one of the above described conditions D1 and D2 becomes satisfied so that it is determined that the excessively large stepping state ends. The control ECU 10 sets the value of the excessively large stepping flag Xfms to "0" through the above initialization routine.

When the value of the excessively large stepping flag is "0", the CPU makes a "Yes" determination at Step 715, and proceeds to Step 720. At Step 720, the CPU determines whether or not the shift position SP is held at the reverse position R.

When the shift position SP is held at the reverse position R, the CPU makes a "Yes" determination at Step 720, and proceeds to Step 725. At Step 725, the CPU determines whether or not a value of a failure flag Xijou is "0".

The value of the failure flag Xijou is set to "1", when the control ECU 10 detects the execution impossible failure. The value of the failure flag Xijou is set to "0", when the control ECU 10 determines that the execution impossible failure has ended. The control ECU 10 sets the value of the failure flag Xijou to "0" through the above initialization routine.

When the value of the failure flag Xijou is "0", the CPU makes a "Yes" determination at Step 725, and proceeds to Step 730. At Step 730, the CPU determines whether or not the vehicle speed Vs is equal to or higher than the threshold speed Vsth.

When the vehicle speed Vs is lower than the threshold speed Vsth, the CPU determines that the excessively large stepping state has not been occurring, because the above described condition C1 does not become satisfied. Accordingly, the CPU makes a "Yes" determination at Step 730, and proceeds to Step 795 to tentatively terminate the present routine.

Whereas, when the vehicle speed Vs is equal to or higher than the threshold speed Vsth, the above described condition C1 becomes satisfied. In this case, the CPU determines that the driver has stepped on the acceleration pedal 22a excessively largely/deeply (the driver performs an excessively large operation). Accordingly, in this case, the CPU makes a "Yes" determination at Step 730, and proceeds to Step 735.

At Step 735, the CPU sets the value of the excessively large stepping flag Xfms to "1", and proceeds to Step 795 to tentatively terminate the present routine.

Whereas, when the CPU proceeds to Step 720, the CPU makes a "No" determination at Step 720, and proceeds to Step 795 to tentatively terminate the present routine, if the shift position SP is held at the position other than the reverse position R.

Whereas, when the CPU proceeds to Step 725, the CPU makes a "No" determination at Step 725, and proceeds to Step 795 to tentatively terminate the present routine, if the value of the failure flag Xijou is "1". When the value of the failure flag Xijou is "1", the failure of the wheel speed sensors 12 has been occurring so that the control ECU 10 cannot calculate the vehicle speed Vs accurately/correctly. Therefore, the CPU is not configured to determine whether or not the above described condition C1 becomes satisfied.

Whereas, when the CPU proceeds to Step 715, the CPU makes a "No" determination at Step 715, and proceeds to Step 795 to tentatively terminate the present routine, if the value of the excessively large stepping flag Xfms is "1".

<Excessively Large Stepping End Determination Routine>

Figure 8:
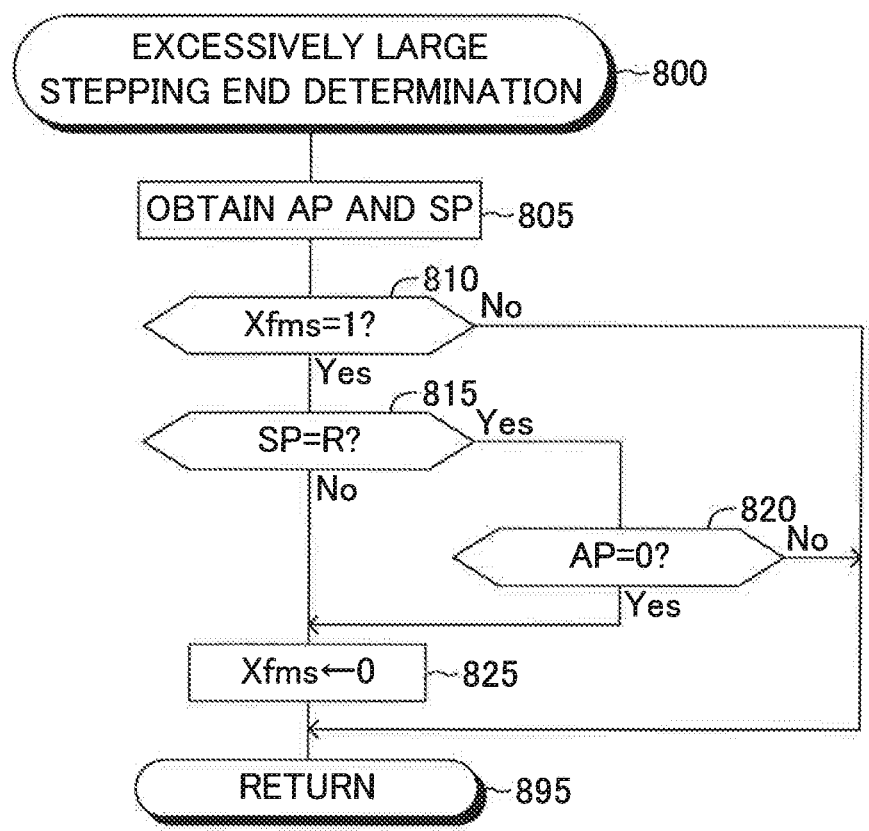
FIG. 8 is a flowchart illustrating a routine executed by the CPU of the control ECU illustrated in FIG. 1.

The CPU is configured to execute a routine (an excessively large stepping end determination routine) represented by a flowchart shown in FIG. 8, every time a predetermined time elapses.

When a predetermined timing has come, the CPU starts processes from Step 800 shown in FIG. 8, and executes Step 805 described below and proceeds to Step 810 described below.

Step 805: The CPU obtains the acceleration pedal operation amount AP and the shift position SP.

Step 810: The CPU determines whether or not the value of the excessively large stepping flag Xfms is "1".

When the value of the excessively large stepping flag Xfms is "0", the CPU makes a "No" determination at Step 810, and proceeds to Step 895 to tentatively terminate the present routine. Whereas, when the value of the excessively large stepping flag Xfms is "1", the CPU makes a "Yes" determination at Step 810, and proceeds to Step 815.

At Step 815, the CPU determines whether or not the shift position SP is held at the reverse position R. When the shift position SP is held at the reverse position R, the CPU makes a "Yes" determination at Step 815, and proceeds to Step 820.

At Step 820, the CPU determines whether or not the acceleration pedal operation amount AP is "0". When the acceleration pedal operation amount AP is larger than "0", the CPU makes a "No" determination at Step 820, and proceeds to Step 895 to tentatively terminate the present routine. In this manner, when neither the above described condition D1 nor the above described condition D2 becomes satisfied, the value of the excessively large stepping flag remains at "1".

Whereas, when the CPU proceeds to Step 815, the condition D1 becomes satisfied, if the shift position SP is not held at the reverse position R, that is, if the shift position SP is held at the position other than the reverse position R. In this case, the CPU makes a "No" determination at Step 815, and proceeds to Step 825. At Step 825, the CPU sets the value of the excessively large stepping flag Xfms to "0", and proceeds to Step 895 to tentatively terminate the present routine.

Whereas, when the CPU proceeds to Step 820, the condition D2 becomes satisfied, if the acceleration pedal operation amount AP is "0". In this case, the CPU makes a "Yes" determination at Step 820, and sets the value of the excessively large stepping flag Xfms to "0" at Step 825. Thereafter, the CPU proceeds to Step 895 to tentatively terminate the present routine.

<Limit Control Routine>

Figure 9:
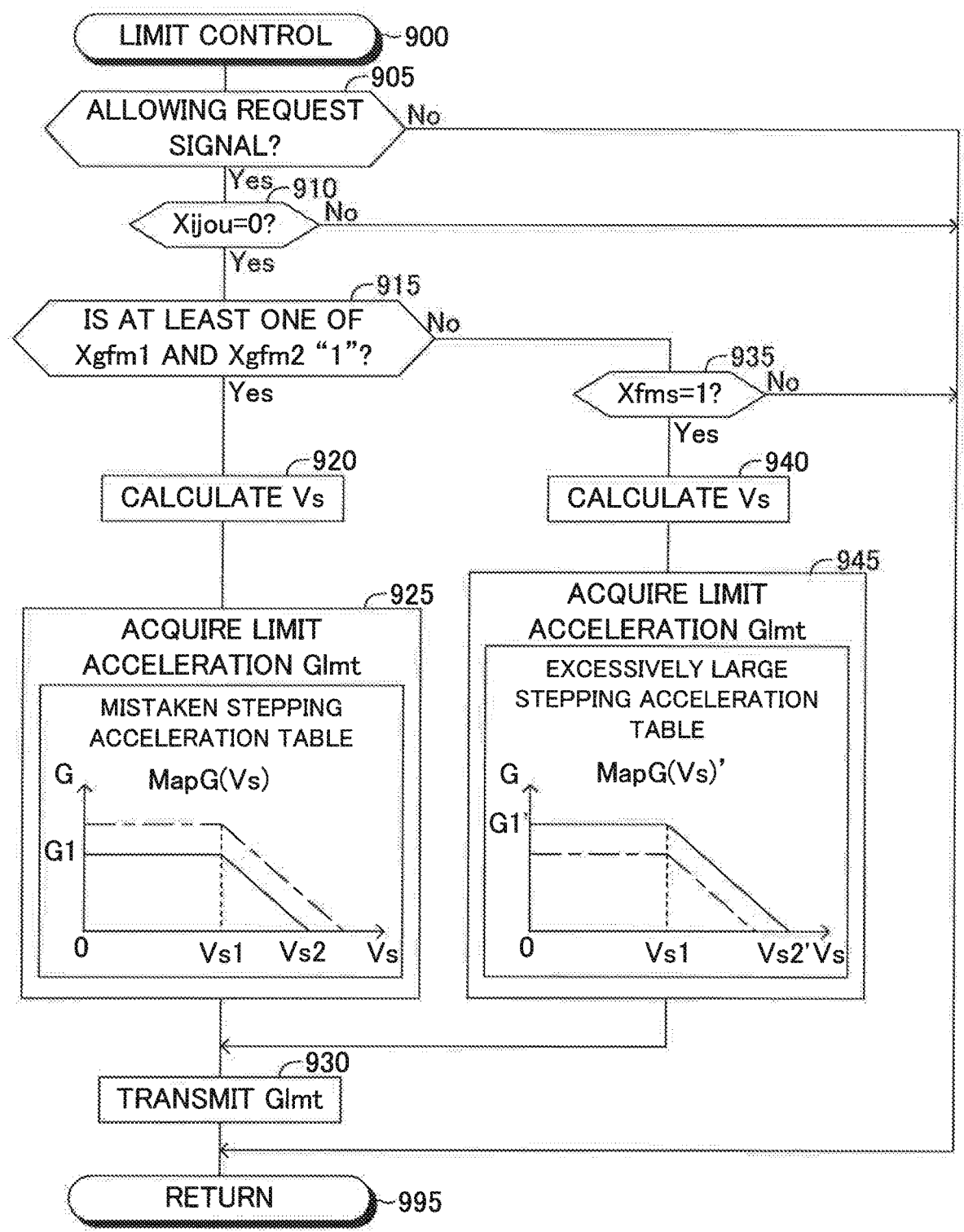
FIG. 9 is a flowchart illustrating a routine executed by the CPU of the control ECU illustrated in FIG. 1.

The CPU is configured to execute a routine (a limit control routine) represented by a flowchart shown in FIG. 9, every time a predetermined time elapses.

When a predetermined timing has come, the CPU starts processes from Step 900 shown in FIG. 9, and executes Step 905. At Step 905, the CPU determines whether or not the CPU receives the allowing request signal from the limit switch 14.

When the CPU has not been receiving the allowing request signal from the limit switch 14, the CPU has been receiving the prohibiting request signal from the limit switch 14. In this case, the CPU makes a "No" determination at Step 905, and proceeds to Step 995 to tentatively terminate the present routine. Consequently, when the limit switch 14 is held at the off-position to transmit the prohibiting request signal, the CPU does not execute the limit control.

When the CPU has been receiving the allowing request signal from the limit switch 14, the CPU makes a "Yes" determination at Step 905, and proceeds to Step 910. At Step 910, the CPU determines whether or not the value of the failure flag Xijou is "0".

When the value of the failure flag Xijou is "0", the CPU makes a "Yes" determination at Step 910, and proceeds to Step 915. At Step 915, the CPU determines whether or not at least one of the values of the first mistaken stepping flag Xgfm1 and the second mistaken stepping flag Xgfm2 is "1".

When at least one of the values of the first mistaken stepping flag Xgfm1 and the second mistaking flag Xgfm2 is "1", the CPU makes a "Yes" determination at Step 915. In this case, the CPU executes Steps 920 to 930 described below in that order, and proceeds to Step 995 to tentatively terminate the present routine.

Step 920: The CPU acquires/calculates the vehicle speed Vs.

Step 925: The CPU acquires the acceleration G which varies depending on (or which is corresponding to) the vehicle speed Vs acquired at Step 920 as the limit acceleration Glmt, by applying the vehicle speed Vs to the mistaken stepping acceleration lookup table MapG(Vs).

The mistaken stepping acceleration lookup table MapG(Vs) defines a relationship between the acceleration G and the vehicle speed Vs. According to the table MapG(Vs), the limit acceleration Glmt is set to a constant acceleration G1, if the vehicle speed Vs is equal to or higher than "0" and lower than "Vs1". Furthermore, according to the table MapG(Vs), the limit acceleration Glmt is set to an acceleration which decreases gradually from the acceleration G1 to "0" as the vehicle speed Vs increases from "Vs1" to "Vs2". According to the table MapG(Vs), the limit acceleration Glmt is set to "0", if the vehicle speed Vs is equal to or higher than a predetermined vehicle speed "Vs2".

Step 930: The CPU transmits the limit acceleration Glmt acquired at Step 925 to the engine ECU 20.

Whereas, when the CPU proceeds to Step 915, the CPU makes a "No" determination at Step 915, and proceeds to Step 935, if both of the values of the first mistaken stepping flag Xgfm1 and the second mistaken stepping flag Xgfm2 are "0".

At Step 935, the CPU determines whether or not the value of the excessively large stepping flag Xfms is "1". When the value of the excessively large stepping flag Xfms is "1", the CPU makes a "Yes" determination at Step 935, and executes Steps 940 and 945 described below in that order. Thereafter, the CPU proceeds to Step 930.

Step 940: The CPU acquires/calculates the vehicle speed Vs.

Step 945: The CPU acquires the acceleration G which varies depending on (or which is corresponding to) the vehicle speed Vs acquired at Step 940 as the limit acceleration Glmt, by applying the vehicle speed Vs to the excessively large stepping acceleration lookup table MapG(Vs)'.

The excessively large stepping acceleration lookup table MapG(Vs)' defines the relationship between the acceleration G and the vehicle speed Vs, similarly to the mistaken stepping acceleration lookup table MapG(Vs). According to the table MapG(Vs)', the limit acceleration Glmt is set to a constant acceleration G1' (>G1), if the vehicle speed Vs is equal to or higher than "0" and lower than "Vs1". Furthermore, according to the table MapG(Vs)', the limit acceleration Glmt is set to an acceleration which decreases gradually from the acceleration G1' to 0 as the vehicle speed Vs increases from "Vs1" to "a predetermined vehicle speed Vs2'(>Vs1)". According to the table MapG(Vs)', the limit acceleration Glmt is set to "0", if the vehicle speed Vs is equal to or higher than the predetermined vehicle speed Vs2'.

The constant acceleration G1 in the mistaken stepping acceleration lookup table MapG(Vs) has been set to a value lower than the constant acceleration G1' in the excessively large stepping lookup table MapG(Vs)'. The vehicle speed Vs2 corresponding to the acceleration G which becomes "0" in the mistaken stepping acceleration lookup table MapG(Vs) is lower than the vehicle speed Vs2' corresponding to the acceleration G which becomes "0" in the excessively large stepping acceleration lookup table MapG(Vs)'. Therefore, the acceleration G corresponding to the vehicle speed Vs in the mistaken stepping acceleration table MapG(Vs) is lower than the acceleration G corresponding to the vehicle speed Vs in the excessively large stepping acceleration lookup table MapG(Vs)'. Accordingly, for an arbitrary vehicle speed Vs (which is higher than 0 and lower than Vs2': 0<Vs<Vs2'), the limit acceleration Glmt through the mistaken stepping limit control is lower than the limit acceleration Glmt through the excessively large stepping limit control. The mistaken stepping limit control is the limit control executed due to the occurrence of the mistaken stepping state. The excessively large stepping limit control is the limit control execute due to the occurrence of the excessively large stepping.

The vehicle VA has a high possibility of being accelerated in a driver's unexpected/unintended manner (or not in an intended manner of the driver) when the mistaken stepping state is occurring. Accordingly, the mistaken stepping limit control needs to control the vehicle VA so as to prevent the acceleration from exceeding the limit acceleration Glmt smaller than the limit acceleration determined through the excessively large stepping limit control. In view of this, as described above, the acceleration G (limit acceleration Glmt) in the mistaken stepping acceleration lookup table MapG(Vs) is lower than the acceleration G (limit acceleration Glmt) in the excessively large stepping acceleration lookup table MapG(Vs)'.

Thereafter, the CPU proceeds to Step 930 to transmit the limit acceleration Glmt acquired at Step 945 to the engine ECU 20.

Whereas, if the value of the excessively large stepping flag Xfms is "0" when the CPU proceeds to Step 935, neither the mistaken stepping state nor the excessively large stepping state has not been occurring. In this case, the CPU makes a "No" determination at Step 935, and proceeds to Step 995 to tentatively terminate the present routine. Consequently, in this case, the limit control is not executed substantially.

Whereas, when the CPU proceeds to Step 910, the CPU makes a "No" determination at Step 910, and proceeds to Step 995 to tentatively terminate the present routine, if the value of the failure flag Xijou is "1". Consequently, when the value of the failure flag Xijou is "1", the CPU does not execute the limit control.

<Failure Determination Routine>

Figure 10:
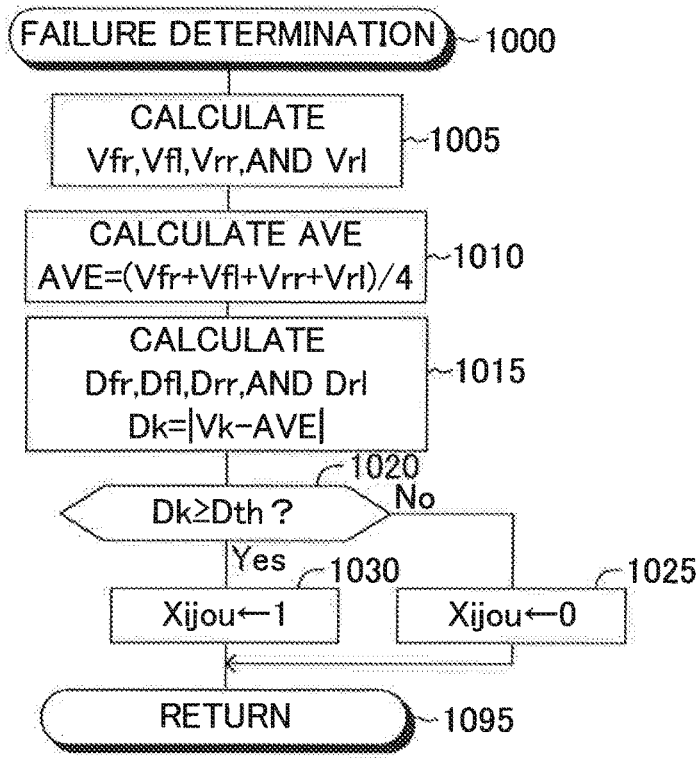
FIG. 10 is a flowchart illustrating a routine executed by the CPU of the control ECU illustrated in FIG. 1.

The CPU is configured to execute a routine (a failure determination routine) represented by a flowchart shown in FIG. 10, every time a predetermined time elapses.

When a predetermined timing has come, the CPU starts processes from Step 1000 shown in FIG. 10, and executes Steps 1005 to 1015 described below in that order. Thereafter, the CPU proceeds to Step 1020.

Step 1005: The CPU calculates wheel speeds Vfr, Vfl, Vrr, and Vrl of the wheels based on the number of the pulse signals PS transmitted from the wheel speed sensors 12 per unit time, respectively. The wheel speed Vfr is the wheel speed of the front right wheel. The wheel speed Vfl is the wheel speed of the front left wheel. The wheel speed Vrr is the wheel speed of the rear right wheel. The wheel speed Vrl is the wheel speed of the rear left wheel.

Step 1010: The CPU acquires/calculates an average value AVE of the wheels speeds Vfr, Vfl, Vrr, and Vrl by applying the wheels speeds Vfr, Vfl, Vrr, and Vrl to the following equation 1.

$$AVE=(Vfr+Vfl+Vrr+Vrl)/4 \qquad \text{(equation 1)}$$

Step 1015: The CPU acquires/calculates, as a difference Dk (k=fr, fl, rr, rl), a magnitude (absolute value) of a value obtained by subtracting the average value AVE from each of the wheel speed Vk (k=fr, fl, rr, rl).

$$Dfr=|Vfr-AVE|$$

$$Dfl=|Vfl-AVE|$$

$$Drr=|Vrr-AVE|$$

$$Drl=|Vrl-AVE|$$

Step 1020: The CPU determines whether or not at least one of the differences Dk (k=fr, fl, rr, rl) is equal to or larger than a threshold Dth.

When none of the differences Dk is equal to or larger than the threshold Dth, the CPU makes a "No" determination at Step 1020, and proceeds to Step 1025. At Step 1025, the CPU sets the value of the failure flag Xijou to "0", and proceeds to Step 1095 to tentatively terminate the present routine.

Whereas, when at least one of the differences Dk is equal to or larger than the threshold Dth, the CPU makes a "Yes" determination at Step 1020, and proceeds to Step 1030. At Step 1030, the CPU sets the value of the failure flag Xijou to "1", and proceeds to Step 1095 to tentatively terminate the present routine.

It should be noted that an additional step described below may be inserted between Step 1010 and Step 1015. That is, at the additional step, the CPU determines whether or not the average value AVE is equal to or large than a threshold AVE0th which has been set to a positive value. When the average value AVE is equal to or larger than the threshold AVE0th, the CPU proceeds to Step 1020. When the average value AVE is smaller than the threshold AVE0th, the CPU directly proceeds to Step 1095.

<Notification Control Routine>

Figure 11:
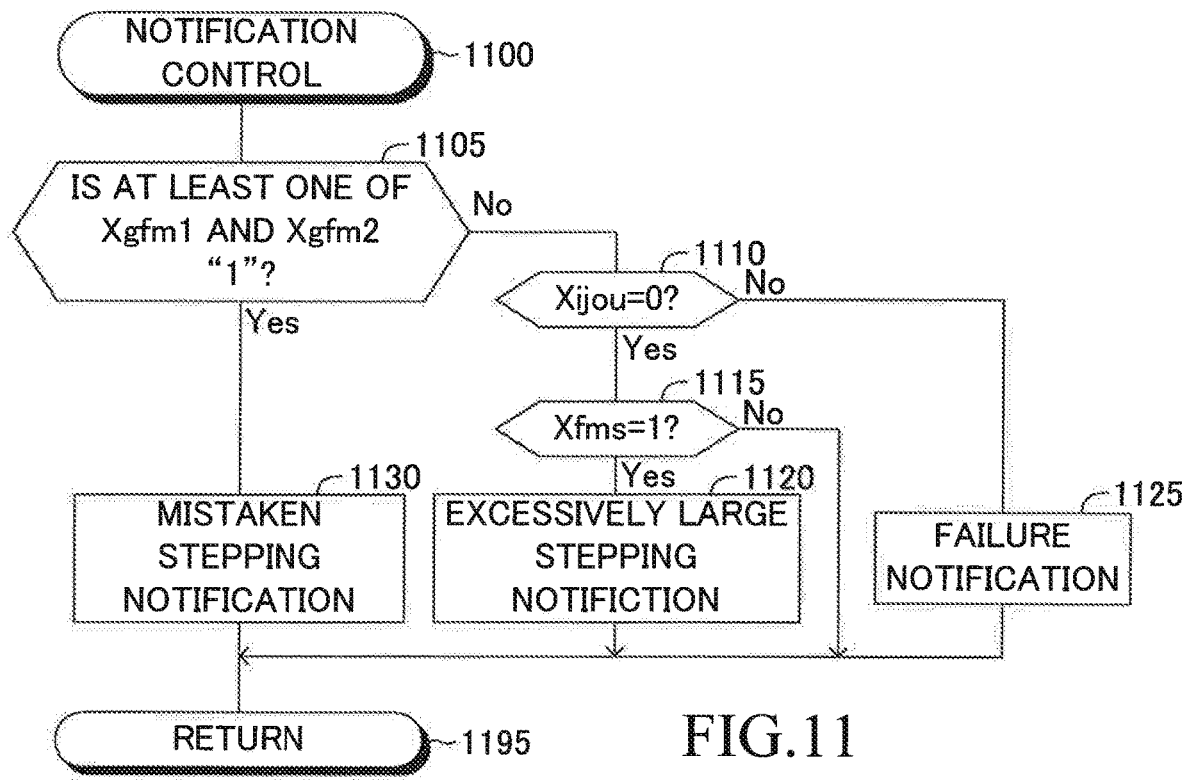
FIG. 11 is a flowchart illustrating a routine executed by the CPU of the control ECU illustrated in FIG. 1.

The CPU is configured to execute a routine (a notification control routine) represented by a flowchart shown in FIG. 11, every time a predetermined time elapses.

When a predetermined timing has come, the CPU starts processes from Step 1100 shown in FIG. 11, and proceeds to Step 1105. At Step 1105, the CPU determines whether or not at least one of the values of the first mistaken stepping flag Xgfm1 and the second mistaken stepping flag Xgfm2 is "1".

When both of the values of the first mistaken stepping flag Xgfm1 and the second mistaken stepping flag Xgfm2 are "0", the CPU makes a "No" determination at Step 1105, and proceeds to Step 1110. At Step 1110, the CPU determines whether or not the value of the failure flag Xijou is "0".

When the value of the failure flag Xijou is "0", the CPU makes a "Yes" determination at Step 1110, and proceeds to Step 1115. At Step 1115, the CPU determines whether or not the value of the excessively large stepping flag Xfms is "1".

When the value of the excessively large stepping flag Xfms is "0", the CPU makes a "No" determination at Step 1115, and proceeds to Step 1195 to tentatively terminate the present routine. Accordingly, all of the values of the first mistaken stepping flag Xgfm1, the second mistaken stepping flag Xgfm2, the failure flag Xijou, and the excessively step flag Xfms are "0", the CPU does not execute any notifications.

Whereas, when the CPU proceeds to Step 1115, the CPU makes a "Yes" determination at Step 1115, and proceeds to Step 1120, if the value of the excessively large stepping flag Xfms is "1". At Step 1120, the CPU executes the excessively large stepping notification, and proceeds to Step 1195 to tentatively terminate the present routine. Accordingly, when all of the values of the first mistaken stepping flag Xgfm1, the second mistaken stepping flag Xgfm2, and the failure flag Xijou are "0", and the excessively step flag Xfms is "1", the CPU executes the excessively large stepping notification.

Whereas, when the CPU proceeds to Step 1110, the CPU makes a "No" determination at Step 1110, and proceeds to Step 1125, if the value of the failure flag Xijou is "1". At Step 1125, the CPU executes the failure notification, and proceeds to Step 1195 to tentatively terminate the present routine. Accordingly, when both of the values of the first mistaken stepping flag Xgfm1 and the second mistaken stepping flag Xgfm2 are "0", and the failure flag Xijou is "1", the CPU executes the failure notification, regardless of the value of the excessively large stepping flag Xfms.

Whereas, when the CPU proceeds to Step 1105, the CPU makes a "Yes" determination at Step 1105, and proceeds to Step 1130, if at least one of the values of the first mistaken stepping flag Xgfm1 and the second mistaken stepping flag Xgfm2 is "1". At Step 1130, the CPU executes the mistaken stepping notification, and proceeds to Step 1195 to tentatively terminate the present routine. Accordingly, when at least one of the values of the first mistaken stepping flag Xgfm1 and the second mistaken stepping flag Xgfm2 is "1", the CPU executes the mistaken stepping notification, regardless of the values of the failure flag Xijou and the excessively large stepping flag Xfms.

As described above, even if the execution impossible failure occurs while the mistaken stepping state is occurring, the CPU continues executing the mistaken stepping notification. Hereby, the CPU can prevent a possibility that driver is urged to end/stop the mistaken stepping from being lowered, even after the execution impossible failure occurs. Whereas, when the execution impossible failure occurs while the mistaken stepping state is not occurring, the CPU executes the failure notification regardless of the occurrence of the excessively large stepping state. Hereby, the driver can immediately notice that the execution impossible failure has occurred.

The present disclosure is not limited to the above described embodiment, and can employ various other modifications within a scope of the present disclosure.

For example, the CPU may determine whether or not the value of the excessively large stepping flag Xfms is "1" at a step (not shown) inserted between Step 1110 and Step 1125. In this case, when the value of the excessively large stepping flag Xfms is "1", the CPU proceeds to Step 1125. When the value of the excessively large stepping flag Xfms is "0", the CPU proceeds to Step 1195 directly without proceeding to Step 1125.

The CPU may determine whether or not a determination start condition becomes satisfied at a step (not shown) inserted between Step 515 and Step 520. The determination start condition becomes satisfied when the vehicle speed Vs is lower than a determination threshold vehicle speed, and the shift position SP is held at either one of the driving position D and the reverse positon R. In this case, when the determination start condition is satisfied, the CPU proceeds to Step 520. When the determination start condition is not satisfied, the CPU proceeds to Step 595 directly.

In the above embodiment, the limit control is the control for limiting the driving force to prevent the actual acceleration Ga from exceeding the limit acceleration Glmt. However, the limit control is not limited to the above embodiment control. For example, the limit control may be a control for limiting the driving force so as to prevent the vehicle speed Vs from exceeding a limit vehicle speed Vslmt, or a control for limiting the driving force so as to prevent an actual driving force of the vehicle VA from exceeding a limit driving force which is determined based on (depending on) the vehicle speed Vs.

The detection method for detecting the failure of the wheel speed sensors 12 is not limited to the above described method. The detection method can employ various methods.

For example, the CPU may determine that a communication failure between the wheel speed sensors 12 and the control ECU 10 has occurred, when a state in which the CPU receives no wheels speed pulse signal PS continues for a time longer than a predetermined time, although the actual throttle valve opening degree TA is larger than "0" and the shift position SP is held at either one of the driving position D and the reverse position R. The above communication failure is also one of the example of the execution impossible failure.

Furthermore, the execution impossible failure is not limited to the failure of the wheel speed sensors 12. For example, the CPU may determine that the execution impossible failure has occurred, when at least one of failures of the acceleration pedal operation amount sensor 22 and the shift position sensor 42 has occurred.

The acceleration pedal operation amount sensor 22 generates a voltage which varies depending on the acceleration pedal operation amount AP. The voltage is applied to each of two signal lines which are separate from each other. The two signal lines are connected to the engine ECU 20. The engine ECU 20 determines that the failure of the acceleration pedal operation amount sensor 22 has occurred when a difference between the voltages applied to the two signal lines becomes larger than a threshold. When the determination is made, the engine ECU 20 transmits a failure signal (indicative of the failure of the acceleration pedal operation amount sensor 22) to the control ECU 10. The control ECU 10 determines that the failure of the acceleration pedal operation amount sensor 22 has occurred when the control ECU 10 receives the failure signal.

Switches are provided, as the shift positon sensors 42, at positions corresponding to the positions (the parking position P, the driving position D, the reverse position R, and the neutral position N) at which the shift lever can be held. Each of the switches is connected to the control ECU 10 via a corresponding signal line. When the shift lever is held at a certain position, the switch corresponding to the certain position becomes an on-state to apply a voltage to the signal line corresponding to this switch. The other switches are in the off-state. The other switches apply no voltage to the signal lines corresponding to these switches. The control ECU 10 determines that the failure of the shift position sensor 42 has occurred when two or more switches become the on-state simultaneously.

Furthermore, the CPU may determine that the execution impossible failure has occurred, when at least one of the engine sensors 24 and the engine actuators 26 fails. More specifically, when the failure of at least one of the engine sensors 24 and the engine actuators 26 occurs, the engine ECU 20 transmits a failure signal indicative of that. The control ECU 10 determines that the execution impossible failure has occurred, when the control ECU 10 receives that failure signal.

The condition D2 which the CPU uses for determining that the excessively large stepping state ends may be a condition D2'.

D2': The acceleration pedal operation amount AP becomes equal to or smaller than a threshold operation amount APth.

The threshold operation amount APth has been set to a positive value extremely close to "0".

In the above embodiment, the CPU displays, on the display 50, a content/message corresponding to each of the mistaken stepping notification, the excessively large stepping notification, and the failure notification. The notification mode of each of the notifications is not limited to the above embodiment. For instance, the CPU may output, from an unillustrated speaker, a voice message representing the content of the each of the mistaken stepping notification, the excessively large stepping notification, and the failure notification.

In the above described embodiment, the drive device 30 is the internal combustion engine. However, the drive device 30 may be a motor, or a combination of the motor and the internal combustion engine. That is, the present disclosure may be applied to an electric motor vehicle, a hybrid vehicle, or the like.

When the vehicle VA is the electric motor vehicle or the hybrid vehicle, a normal target driving torque of the vehicle VA is determined based on the acceleration pedal operation amount AP and the vehicle speed Vs. The drive device 30 is controlled in such a manner that a torque acted on/to each of the driving wheels becomes equal to the normal target driving torque. Accordingly, the control ECU 10 installed in such a vehicle VA determines a limit target driving torque smaller than the normal target driving torque to control the drive device 30 in such a manner that the torque acted on/to each of the driving wheels becomes equal to the limit target driving torque, when the actual acceleration Ga is larger than the limit acceleration Glmt.

The accelerator is not limited to the acceleration pedal 22a. For example, the accelerator may be an acceleration lever.

The control ECU 10 may be configured to transmit the limit acceleration Glmt to a brake device (not shown) and a brake ECU (not shown). In this case, the brake ECU may be configured to drive the brake device so as to act a brake force on/to each of the wheels, when the actual acceleration Ga exceeds the limit acceleration Glmt even after the throttle valve opening degree became "0".

What is claimed is:
1. A vehicle control device comprises:
an accelerator which a driver of a vehicle operates in order to accelerate the vehicle; and
a controller configured to execute a limit control for imposing a limitation on a driving force varied depending on an operation amount of the accelerator and applied to the vehicle, in such a manner that the driving force is prevented from becoming higher than a predetermined threshold, when the controller determines that a predetermined limit condition is satisfied;
wherein the controller is configured to:
determine whether or not a mistaken operation state has occurred, the mistaken operation state being a state in which the driver has a high possibility of operating the accelerator while mistaking the accelerator for another driving operation element;
determine that the limit condition is satisfied to execute the limit control and a mistaken operation notification for urging the driver to end operating the accelerator, when it is determined that the mistaken operation state has occurred;
determine whether or not a control failure that the controller cannot execute the limit control has occurred;
execute a failure notification for notifying the driver that the control failure is occurring at a failure occurrence time point at which it is determined that the control failure has occurred, if it is determined that the mistaken operation state has not been occurring at the failure occurrence time point; and continue executing the mistaken operation notification without executing the failure notification at the failure occurrence time point, if it is determined that the mistaken operation state has been occurring at the failure occurrence time point.

2. The vehicle control device according to claim 1, wherein the controller is configured to:

determine whether or not an excessively large operation state which is different from the mistaken operation state has occurred, the excessively large operation state being a state in which the controller can regard that the operation amount of the accelerator is higher than a predetermined threshold;

determine that the limit condition is satisfied to execute the limit control, when it is determined that the excessively large operation state has occurred;

execute an excessively large operation notification for notifying the driver that the limit control is being executed, when it is determined that the mistaken operation state has not being occurring and that the excessively large operation state has been occurring; and end the excessively large operation notification and execute the failure notification at the failure occurrence time point, if it is determined that the mistaken operation state has not been occurring at the failure occurrence time point and that the excessively large operation state has been occurring at the failure occurrence time point.

3. The vehicle control device according to claim 1, further comprising a vehicle speed sensor for measuring a vehicle speed, wherein the controller is configured to:

calculate a limit acceleration based on the vehicle speed measured by the vehicle speed sensor;

execute, as the limit control, a control for imposing a limitation on the driving force in such a manner that an actual acceleration of the vehicle is prevented from exceeding the limit acceleration; and determine whether or not the control failure has occurred by determining whether or not a failure has occurred in the vehicle speed sensor.

4. The vehicle control device according to claim 2, further comprising a vehicle speed sensor for measuring a vehicle speed, wherein the controller is configured to:

determine that the mistaken operation state has occurred, when at least one of a first case and a second case has occurred, the first case being a case where an accelerator operating state in which the driver is operating the accelerator is occurring at a reverse position changing time point at which the driver has changed a shift position of the vehicle to a reverse position for reversing the vehicle, and a second case being a case where the accelerator operating state has occurred during a time period from the reverse position changing time point to a time point at which a predetermined time elapses from the reverse position changing time point; and determine that the excessively large operation state has occurred, when the shift position of the vehicle is held at the reverse position and the vehicle speed is equal to or higher than a threshold speed.

5. The vehicle control device according to claim 2, further comprising a vehicle speed sensor for measuring a vehicle speed, wherein the controller is configured to:

acquire a mistaken operation limit acceleration by applying the vehicle speed measured by the vehicle speed sensor to a predetermined first relationship between the vehicle speed and the mistaken operation limit acceleration, when it is determined that the mistaken operation state has been occurring;

execute, as the limit control, a control for imposing a limitation on the driving force in such a manner that an actual acceleration of the vehicle is prevented from exceeding the mistaken operation limit acceleration;

acquire an excessively large operation limit acceleration by applying the vehicle speed measured by the vehicle speed sensor to a predetermined second relationship between the vehicle speed and the excessively large operation limit acceleration, when it is determined that the mistaken operation state has not been occurring and the excessively large operation state has been occurring; and execute, as the limit control, a control for imposing a limitation on the driving force in such a manner that the actual acceleration of the vehicle is prevented from exceeding the excessively large operation limit acceleration, wherein the first relationship and the second relationship have been defined in such a manner that the mistaken operation limit acceleration for an arbitrary vehicle speed within a range from zero to a predetermined vehicle speed is smaller than the excessively large operation limit acceleration for the arbitrary vehicle speed.

* * * * *